US012604243B2

(12) United States Patent
Jin

(10) Patent No.: US 12,604,243 B2
(45) Date of Patent: Apr. 14, 2026

(54) METHOD AND APPARATUS FOR PERFORMING CONDITIONAL PSCELL ADDITION AND CHANGE CONTINUOUSLY IN WIRELESS COMMUNICATION SYSTEM

(71) Applicant: Samsung Electronics Co., Ltd., Suwon-si (KR)

(72) Inventor: Seungri Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 218 days.

(21) Appl. No.: 18/365,723

(22) Filed: Aug. 4, 2023

(65) Prior Publication Data

US 2024/0049076 A1 Feb. 8, 2024

(30) Foreign Application Priority Data

Aug. 4, 2022 (KR) ......................... 10-2022-0097235

(51) Int. Cl.
*H04W 36/00* (2009.01)
*H04W 36/08* (2009.01)

(52) U.S. Cl.
CPC ..... *H04W 36/00835* (2018.08); *H04W 36/08* (2013.01)

(58) Field of Classification Search
CPC ......... H04W 36/0005; H04W 36/0055; H04W 36/0069; H04W 36/00692; H04W 36/0079; H04W 36/0083; H04W 36/00833; H04W 36/00835; H04W 36/0085; H04W 36/0088; H04W 36/0094; H04W 36/08; H04W 36/24; H04W 36/26; H04W 36/30; H04W 36/34; H04W 36/36; H04W 36/38

See application file for complete search history.

(56) References Cited

U.S. PATENT DOCUMENTS

| | | | |
|---|---|---|---|
| 2021/0051534 A1 | 2/2021 | Xu et al. | |
| 2021/0099926 A1* | 4/2021 | Chen | H04W 36/362 |
| 2023/0262541 A1* | 8/2023 | Ozturk | H04W 36/0058 370/331 |
| 2024/0040452 A1* | 2/2024 | Tsai | H04W 36/0069 |
| 2025/0168721 A1* | 5/2025 | Wang | H04W 36/0069 |

FOREIGN PATENT DOCUMENTS

| | | |
|---|---|---|
| KR | 10-2022-0052820 A1 | 4/2022 |
| WO | 2021/109394 A1 | 6/2021 |

OTHER PUBLICATIONS

Vivo, Discussion on RRCReconfiguration for CPC and CHO, R2-2204801, 3GPP TSG RAN WG2 Meeting #118-e, Electronic, Apr. 25, 2022.
Mediatek Inc., Revised WID on Further NR mobility enhancements, RP-221799, 3GPP TSG RAN Meeting #96, Budapest, Hungary, Jun. 8, 2022.

(Continued)

*Primary Examiner* — Matthew W Genack
(74) *Attorney, Agent, or Firm* — Jefferson IP Law, LLP

(57) ABSTRACT

The disclosure relates to a 5G or 6G communication system for supporting a higher data transmission rate. An embodiment of the disclosure may provide a method and apparatus for performing conditional PSCell addition and change continuously in a next-generation mobile communication system.

16 Claims, 13 Drawing Sheets

(56)     References Cited

OTHER PUBLICATIONS

Ericsson, Summary of [AT118-e][225][DCCA] RRC for CPAC (Ericsson) for 6.2.3, R2-2206168, 3GPP TSG-RAN WG2 Meeting #118e, Electronical meeting, May 27, 2022.
ZTE Corporation et al., Corrections on TS 37.340 for DCCA enhancement, R2-2206829, 3GPP TSG-RAN WG2 Meeting #118-e, Online, May 27, 2022.
International Search Report dated Oct. 18, 2023, issued in International Application No. PCT/KR2023/011408.
European Search Report dated Oct. 10, 2025, issued in European Application No. 23850457.5.

* cited by examiner

FIG. 1I

Option 2-1 (1i-05)

1i-10

| A/D | R | R | R | R | R | R | R |

1i-15

Option 2-2 (1i-20)

1i-25

| P$_1$ | P$_2$ | P$_3$ | P$_4$ | P$_5$ | P$_6$ | P$_7$ | P$_8$ |

FIG. 1K

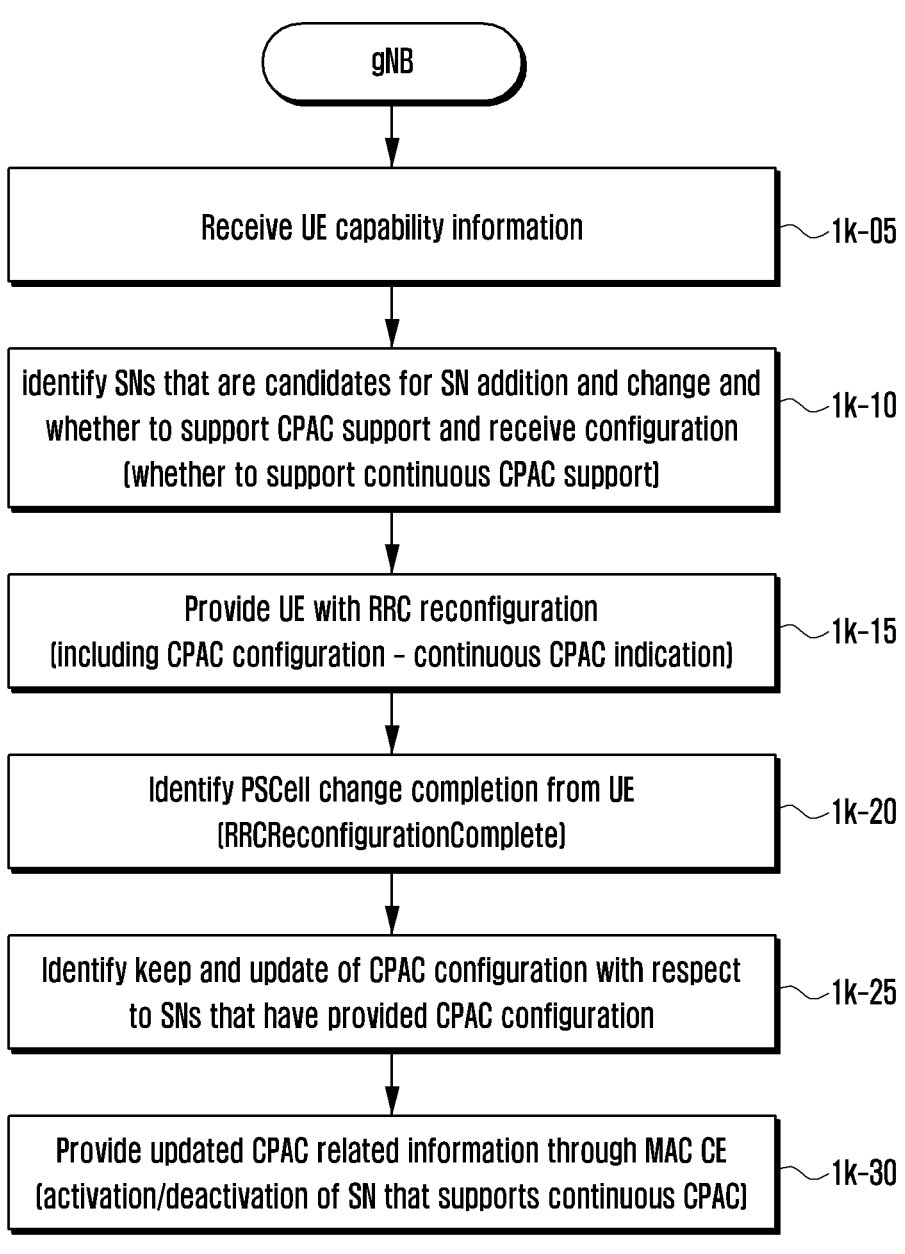

gNB

Receive UE capability information — 1k-05 identify SNs that are candidates for SN addition and change and whether to support CPAC support and receive configuration (whether to support continuous CPAC support) — 1k-10

Provide UE with RRC reconfiguration (including CPAC configuration – continuous CPAC indication) — 1k-15

Identify PSCell change completion from UE (RRCReconfigurationComplete) — 1k-20

Identify keep and update of CPAC configuration with respect to SNs that have provided CPAC configuration — 1k-25

Provide updated CPAC related information through MAC CE (activation/deactivation of SN that supports continuous CPAC) — 1k-30

FIG. 1M

METHOD AND APPARATUS FOR PERFORMING CONDITIONAL PSCELL ADDITION AND CHANGE CONTINUOUSLY IN WIRELESS COMMUNICATION SYSTEM

CROSS-REFERENCE TO RELATED APPLICATION(S)

This application is based on and claims priority under 35 U.S.C. § 119(a) of a Korean patent application number 10-2022-0097235, filed Aug. 4, 2022, in the Korean Intellectual Property Office, the disclosure of which is incorporated by reference herein in its entirety.

BACKGROUND

1. Field

The disclosure relates to the operations of a terminal and a base station in a mobile communication system.

2. Description of Related Art

Fifth generation (5G) mobile communication technologies define broad frequency bands such that high transmission rates and new services are possible, and can be implemented not only in "Sub 6 gigahertz (GHz)" bands such as 3.5 GHz, but also in "Above 6 GHz" bands referred to as millimeter wave (mmWave) including 28 GHz and 39 GHz. In addition, it has been considered to implement sixth generation (6G) mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multi-input multi-output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of Band-Width Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

The disclosure is an improvement technique for conditional primary secondary cell group (SCG) cell (PSCell) addition and change (CPA) and conditional PSCell change (CPC); conditional PSCell addition and change (CPAC) applied to an existing NR system. In the case of an existing NR system, after secondary cell group (SCG) change is performed, all candidate SCG configurations stored in the UE are released, making continuous CPAC operation impossible. That is, once CPAC is applied and performed to the UE, in order to perform the CPAC operation again, the base station must again pass down the CPAC configuration to the UE through radio resource control (RRC) configuration.

Aspects of the disclosure are to address at least the above-mentioned problems and/or disadvantages and to provide at least the advantages described below. Accordingly, an aspect of the disclosure is to provide a continuous CPAC support method.

Additional aspects will be set forth in part in the description which follows and, in part, will be apparent from the description, or may be learned by practice of the presented embodiments.

In accordance with an aspect of the disclosure, a method performed by a terminal in a wireless communication system is provided. The method includes receiving, from a base station, a first message comprising conditional reconfiguration information, the conditional reconfiguration information comprising configuration information of at least one candidate primary secondary cell group (SCG) cell (PSCell), information on at least one execution condition for a conditional PSCell addition (CPA) or a conditional PSCell change (CPC) of the at least one candidate PSCell, and information indicating to maintain the conditional reconfiguration information after a PSCell addition or a PSCell change; identifying a first PSCell, in case that at least one execution condition for the first PSCell among the at least one candidate PSCell is satisfied for the CPA or the CPC based on the conditional reconfiguration information; transmitting, to the base station, a second message for an addition of the first PSCell or for a changing to the first PSCell; and evaluating the at least one execution condition of the at least one candidate PSCell.

In an embodiment, the method further comprises identifying a second PSCell, in case that at least one execution condition for the second PSCell among the at least one candidate PSCell is satisfied for the CPC based on the conditional reconfiguration information; and transmitting, to the base station, a third message for a changing from the first PSCell to the second PSCell.

In an embodiment, the method further comprises transmitting, to the base station, capability information of the terminal comprising information indicating that the terminal supports maintaining the conditional reconfiguration information after a PSCell addition procedure or a PSCell change procedure is performed.

In an embodiment, the first message is a message to modify a radio resource control (RRC) connection.

In an embodiment, the information indicating to maintain the conditional reconfiguration information after the PSCell addition or the PSCell change is configured to each of the at least one candidate PSCell.

In accordance with another aspect of the disclosure, a method performed by a first base station in a wireless communication system is provided. The method includes transmitting, to a terminal, a first message comprising conditional reconfiguration information, the conditional reconfiguration information comprising configuration information of at least one candidate primary secondary cell group (SCG) cell (PSCell), information on at least one execution condition for a conditional PSCell addition (CPA) or a conditional PSCell change (CPC) of the at least one candidate date PSCell, and information indicating to maintain the conditional reconfiguration information after a PSCell addition or a PSCell change; receiving, from the terminal, a second message for an addition of a first PSCell or for a changing to the first PSCell, in case that at least one execution condition for the first PSCell among the at least one candidate PSCell is satisfied for the CPA or the CPC based on the conditional reconfiguration information; and transmitting, to a second base station for the first PSCell, a third message for the addition of the first PSCell or for the changing to the first PSCell, wherein the conditional reconfiguration information is maintained after the addition of the first PSCell or the changing to the first PSCell.

In an embodiment, the method further comprises receiving, from the terminal, a fourth message for a changing from the first PSCell to a second PSCell, in case that at least one execution condition for the second PSCell among the at least one candidate PSCell is satisfied for the CPC based on the conditional reconfiguration information.

In an embodiment, the method further comprises receiving, from the terminal, capability information of the terminal comprising information indicating that the terminal supports maintaining the conditional reconfiguration information after a PSCell addition procedure or a PSCell change procedure is performed.

In an embodiment, the first message is a message to modify a radio resource control (RRC) connection.

In an embodiment, the information indicating to maintain the conditional reconfiguration information after the PSCell addition or the PSCell change is configured to each of the at least one candidate PSCell.

In accordance with another aspect of the disclosure, a terminal in a wireless communication system is provided. The terminal includes a transceiver; and a controller coupled with the transceiver and configured to receive, from a base station, a first message comprising conditional reconfiguration information, the conditional reconfiguration information comprising configuration information of at least one candidate primary secondary cell group (SCG) cell (PSCell), information on at least one execution condition for a conditional PSCell addition (CPA) or a conditional PSCell change (CPC) of the at least one candidate PSCell, and information indicating to maintain the conditional reconfiguration information after a PSCell addition or a PSCell change, identify a first PSCell, in case that at least one execution condition for the first PSCell among the at least one candidate PSCell is satisfied for the CPA or the CPC based on the conditional reconfiguration information, transmit, to the base station, a second message for an addition of the first PSCell or for a changing to the first PSCell, and evaluate the at least one execution condition of the at least one candidate PSCell.

In accordance with another aspect of the disclosure, a first base station in a wireless communication system is provided. The first base station includes a transceiver; and a controller coupled with the transceiver and configured to transmit, to a terminal, a first message comprising conditional reconfiguration information, the conditional reconfiguration information comprising configuration information of at least one candidate primary secondary cell group (SCG) cell (PSCell), information on at least one execution condition for a conditional PSCell addition (CPA) or a conditional PSCell change (CPC) of the at least one candidate PSCell, and information indicating to maintain the conditional reconfiguration information after a PSCell addition or a PSCell change, receive, from the terminal, a second message for an addition of a first PSCell or for a changing to the first PSCell, in case that at least one execution condition for the first PSCell among the at least one candidate PSCell is satisfied for the CPA or the CPC based on the conditional reconfiguration information, and transmit, to a second base station for the first PSCell, a third message for the addition of the first PSCell or for the changing to the first PSCell, wherein the conditional reconfiguration information is maintained after the addition of the first PSCell or the changing to the first PSCell.

According to the continuous CPAC support method proposed in the disclosure, the base station can configure and instruct the UE a candidate SCG for continuous CPAC, so that the UE can keep the corresponding configuration even after changing the SCG configuration, and the base station can support a continuous CPAC operation according to channel conditions, etc. without additional RRC configuration. Accordingly, unnecessary RRC signaling can be reduced and dynamic CPAC operation tailored to channel status can be performed.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1I is diagram illustrating a structure of medium access control (MAC) control element (CE) signaling to continuously update candidate SCG configuration to support conditional PSCell addition and change according to an embodiment of the disclosure;

FIG. 1K is a diagram illustrating a base station operation to which embodiments of the disclosure is applied, which embodies a base station operation when conditional PSCell addition and change are continuously applied according to an embodiment of the disclosure;

FIG. 1M is a block diagram illustrating a constitution of a base station according to an embodiment of the disclosure.

Throughout the drawings, it should be noted that like reference numbers are used to depict the same or similar elements, features, and structures.

DETAILED DESCRIPTION

Figure 1A:
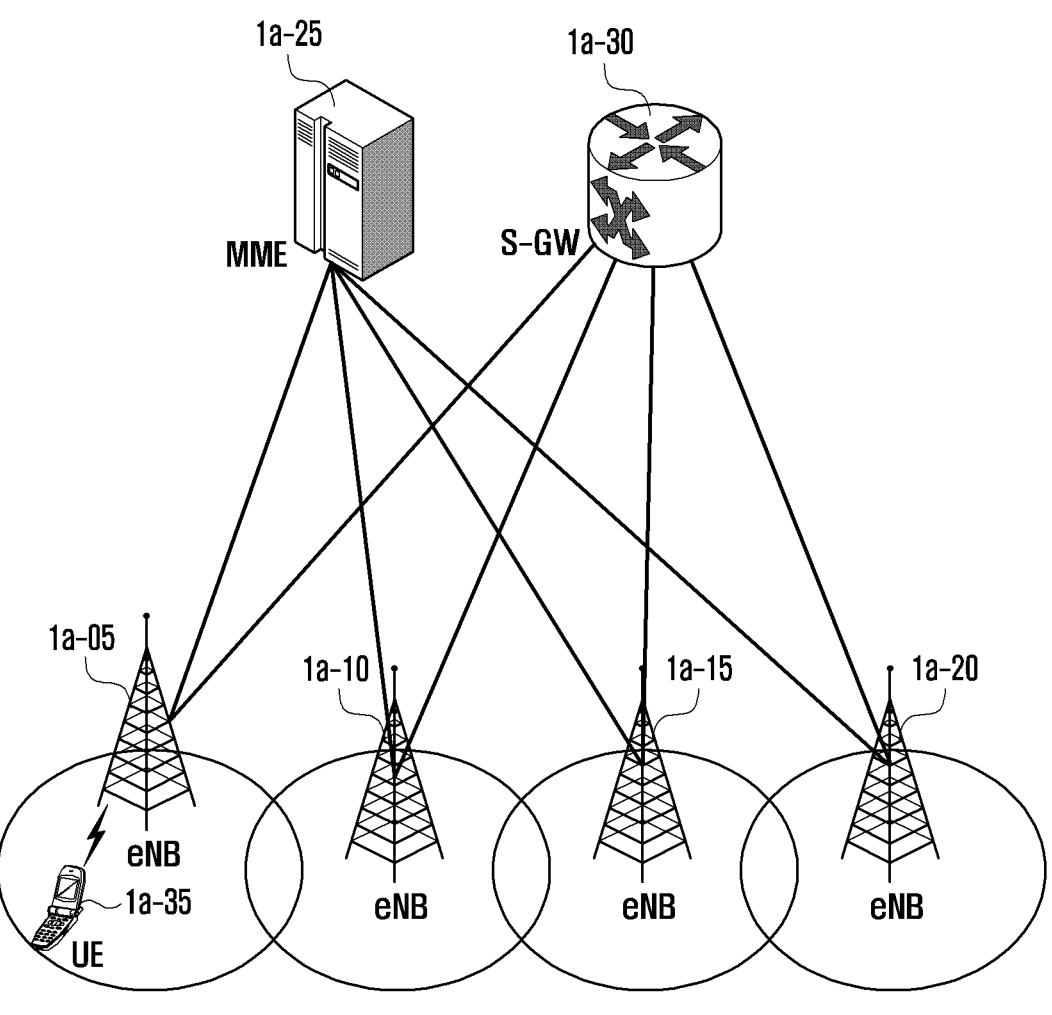
FIG. 1A is a diagram illustrating a structure of a long term evolution (LTE) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some components may be exaggerated, omitted, or schematically illustrated. Further, the size of each component does not entirely reflect the actual size. In the drawings, identical or corresponding components are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like components.

Here, it will be understood that each block of the flow-chart illustrations, and combinations of blocks in the flow-chart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block(s). These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block(s). The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block(s).

In addition, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Here, the 'unit' refers to a software element or a hardware component, such as a Field Programmable Gate Array (FPGA) or an Application Specific Integrated Circuit (ASIC), which performs a predetermined function. However, the 'unit' does not always have a meaning limited to software or hardware. The 'unit' may be constructed either to be stored in an addressable storage medium or to execute one or more processors. Therefore, the 'unit' includes, for example, software components, object-oriented software components, class components or task components, processes, functions, properties, procedures, sub-routines, segments of a program code, drivers, firmware, micro-codes, circuits, data, database, data structures, tables, arrays, and parameters. The components and functions provided by the 'unit' may be either combined into a smaller number of components and 'units' or divided into a larger number of components and 'units'. Moreover, the components and 'units" or "modules" may be implemented to reproduce one or more central processing units (CPUs) within a device or a security multimedia card.

Specific terms used in the following description are provided to facilitate understanding of the disclosure, and use of such specific terms may be modified to a different from without deviating from the technical idea of the disclosure.

In the following description, terms used to identify an access node, terms referred to as network entities, terms expressing messages, terms representing interfaces between network objects, terms used for various types of identification information, etc. are used for the sake of convenient description. Therefore, the disclosure is not limited by the terms described below and may use other terms indicating components with the technical meanings equivalent to the terms described in the disclosure.

For the sake of convenient description, the disclosure uses terms and names defined in the specifications of the $3^{rd}$ generation partnership project long term evolution $3^{rd}$ generation partnership project long term evolution (3GPP LTE).

However, it should be understood that the disclosure is not limited to the terms and names and may also be applied to systems following the other standards.

FIG. 1A is a diagram illustrating a structure of an LTE system according to an embodiment of the disclosure.

Referring to FIG. 1A, as illustrated, a radio access network of an LTE system includes a next-generation base stations (evolved node B, hereinafter, eNB, Node B, or base station) 1a-05, 1a-10, 1a-15, and 1a-20, a mobility management entity (MME) 1a-25, and a serving-gateway (S-GW) 1a-30. A user equipment (hereinafter, UE or terminal) 1a-35 is connected to an external network through the eNBs 1a-05 to 1a-20 and the S-GW 1a-30.

Referring to FIG. 1A, the eNBs 1a-05 to 1a-20 correspond to the existing node B of a UMTS system. The eNBs 1a-05 to 1a-20 are connected to the UE 1a-35 through a radio channel and performs more complicated role than the existing node B. In the LTE system, in addition to a real-time service like a voice over Internet protocol (VoIP) through the Internet protocol, all the user traffics are served through a shared channel and therefore a device for collecting and scheduling status information such as a buffer status, an available transmission power status, and a channel state of the UEs 1a-35 is required. Here, the eNBs 1a-05 to 1a-20 take charge of the collecting and scheduling. One eNB 1a-05 to 1a-20 generally controls a plurality of cells. For example, to implement a transmission rate of 100 Mbps, the LTE system uses, as a radio access technology, orthogonal frequency division multiplexing (hereinafter, OFDM) in, for example, a bandwidth of 20 MHz. Further, an adaptive modulation & coding (hereinafter, AMC) determining a modulation scheme and a channel coding rate depending on a channel status of the UE 1a-35 is applied. The S-GW 1a-30 is a device for providing a data bearer and generates or removes the data bearer according to the control of the MME 1a-25. The MME 1a-25 is a device for performing a mobility management function for the UE 1a-35 and various control functions and is connected to a plurality of base stations 1a-05 to 1a-20.

Figure 1B:
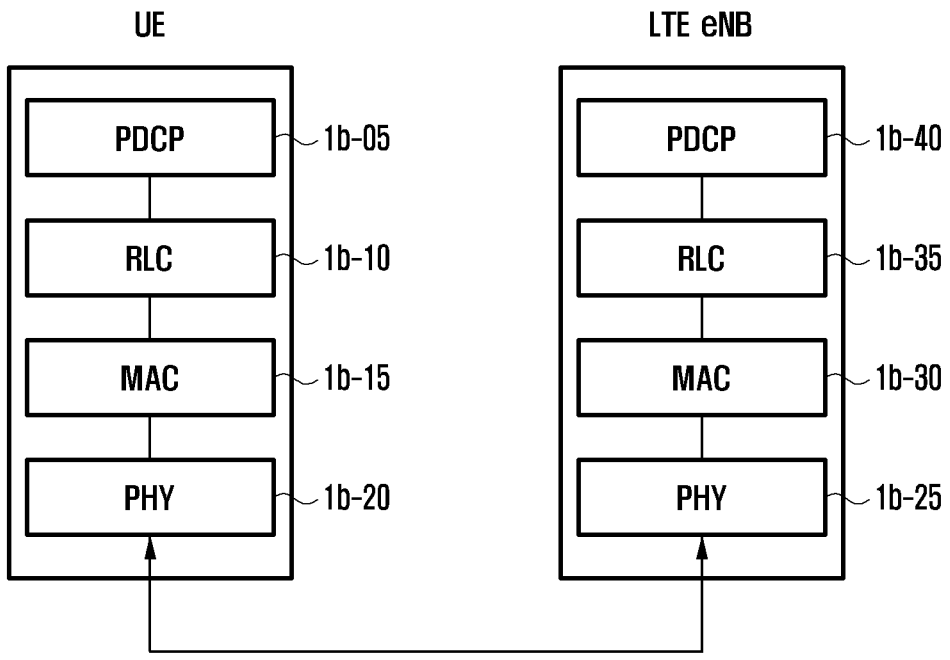
FIG. 1B is a diagram illustrating a radio protocol structure in an LTE system according to an embodiment of the disclosure.

FIG. 1B is a diagram illustrating a radio protocol structure in an LTE system according to an embodiment of the disclosure.

Referring to FIG. 1B, the radio protocol of the LTE system consists of packet data convergence protocols (PDCPs) 1b-05 and 1b-40, radio link controls (RLCs) 1b-10 and 1b-35, and medium access controls (MACs) 1b-15 and 1b-30 in the UE and the eNB, respectively. The PDCPs 1b-05 and 1b-40 take charge of the operation of the IP header compression/recovery, etc. The main functions of the PDCP 1b-05 or 1b-40 is summarized as follows.

Header compression and decompression function: robust header compression (ROHC) only Transfer function of user data In-sequence delivery function (In-sequence delivery of upper layer packet data units (PDUs) at PDCP re-establishment procedure for RLC acknowledged mode (AM))

Reordering function (For split bearers in dual connectivity (DC) (only support for RLC AM): PDCP PDU routing for transmission and PDCP PDU reordering for reception)

Duplicate detection function (Duplicate detection of lower layer service data units (SDUs) at PDCP re-establishment procedure for RLC AM)

Retransmission function (Retransmission of PDCP SDUs at handover and, for split bearers in DC, of PDCP PDUs at PDCP data-recovery procedure, for RLC AM)

Ciphering and deciphering functions

Timer-based SDU discard function (Timer-based SDU discard in uplink.)

The radio link control (hereinafter referred to as RLC) 1b-10 or 1b-35 reconstitutes the PDCP packet data unit (PDU) at an appropriate size to perform an automatic repeat reQuest (ARQ) operation, or the like. The main function of the RLC is summarized as follows.

Data transfer function (Transfer of upper layer PDUs)

ARQ function (Error Correction through ARQ (only for AM data transfer))

Concatenation, segmentation and reassembly functions (Concatenation, segmentation and reassembly of RLC SDUs (only for unacknowledged mode (UM) and AM data transfer))

Re-segmentation function (Re-segmentation of RLC data PDUs (only for AM data transfer))

Reordering function (Reordering of RLC data PDUs (only for UM and AM data transfer)

Duplicate detection function (Duplicate detection (only for UM and AM data transfer))

Error detection function (Protocol error detection (only for AM data transfer))

RLC SDU discard function (RLC SDU discard (only for UM and AM data transfer))

RLC re-establishment function

The MACs 1b-15 and 1b-30 are connected to several RLC layer devices constituted in one terminal and performs an operation of multiplexing RLC PDUs in an MAC PDU and demultiplexing the RLC PDUs from MAC PDU. The main function of MAC is summarized as follows.

Mapping function (Mapping between logical channels and transport channels)

Multiplexing and demultiplexing functions (Multiplexing/demultiplexing of MAC SDUs belonging to one or different logical channels into/from transport blocks (TB) delivered to/from the physical layer on transport channels)

Scheduling information reporting function

Hybrid automatic repeat request (HARQ) function (Error correction through HARQ)

Priority handling function between logical channels (Priority handling between logical channels of one UE)

Priority handling function between UEs (Priority handling between UEs by means of dynamic scheduling)

MBMS service identification function

Transport format selection function

Padding function

Physical layers (PHYs) 1b-20 and 1b-25 perform an operation of channel-coding and modulating upper layer data, making them as an OFDM symbol, and transmitting them to the radio channel or an operation of demodulating the OFDM symbol received through the radio channel, channel-decoding it, and transmitting it to an upper layer. In addition, the physical layers also use hybrid ARQ (HARQ) to additionally correct errors, where the reception stage transmits 1 bit as to whether the reception stage receives the packets transmitted from the transmission stage, which is called HARQ ACK/NACK. Downlink HARQ ACK/NACK in response to uplink transmission is transmitted via physical Hybrid-ARQ indicator channel (PHICH). Uplink HARQ ACK/NACK in response to downlink transmission is transmitted via physical uplink control channel (PUCCH) or physical uplink shared channel (PUSCH) physical channel.

Meanwhile, the PHY layers 1b-20 and 1b-25 may include one or more frequencies/carriers and a technology for simultaneously configuring and using a plurality of frequencies is called carrier aggregation (CA). According to the CA technology, instead of using only one carrier for communication between a terminal (or user equipment (UE)) and a base station (E-UTRAN NodeB (eNB)), one primary carrier and a plurality of secondary carriers are used and thus data capacity may be greatly increased by the number of secondary carriers. Meanwhile, in LTE, a cell served by the base station using the primary carrier is called a primary cell (PCell) and a cell served by the base station using the secondary carrier is called a secondary cell (SCell).

Although not illustrated in the drawing, radio resource control (hereinafter, referred to as RRC) layers exist above the PDCP layers of the UE and the base station, respectively, and the RRC layers may exchange configuration control messages related to access and measurement for the sake of radio resource control.

Figure 1C:
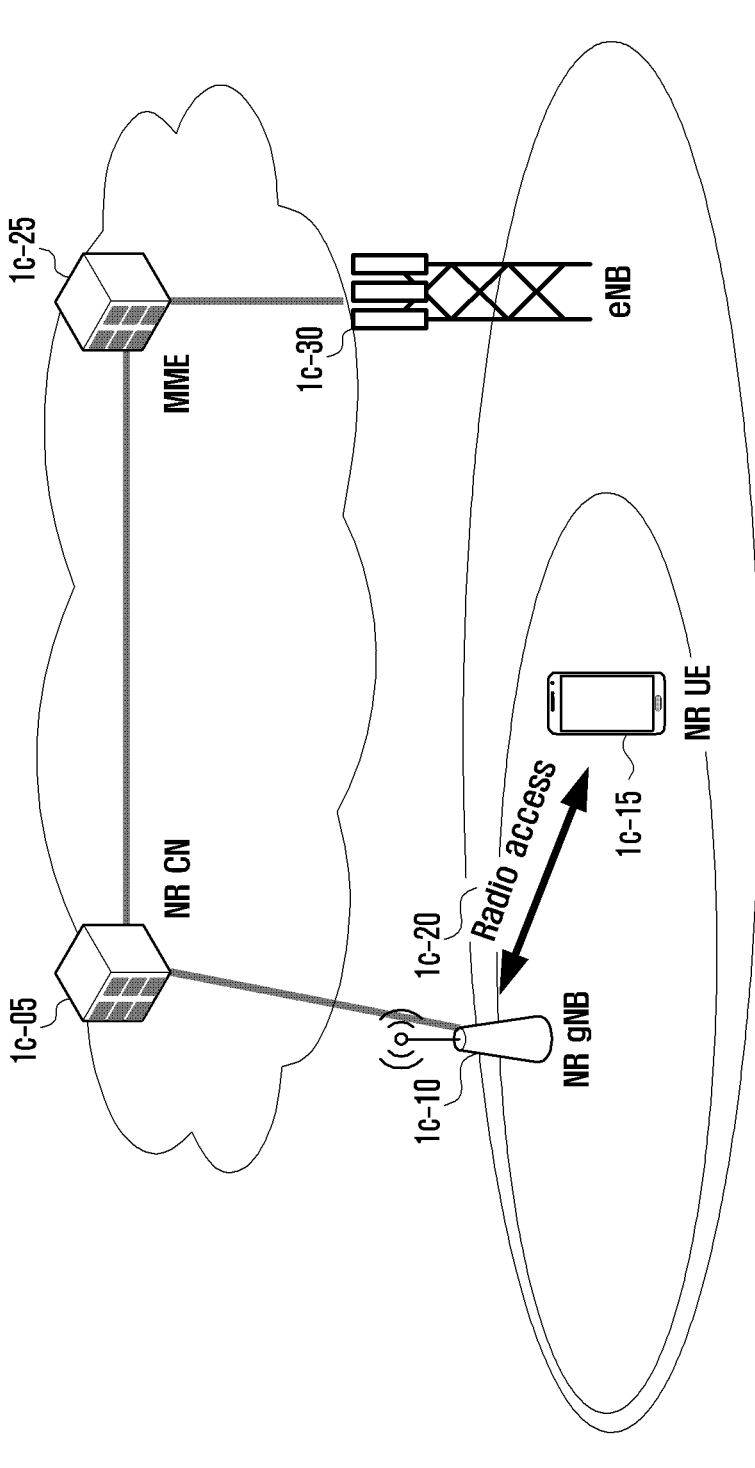
FIG. 1C is a diagram illustrating the structure of a next-generation mobile communication system according to an embodiment of the disclosure.

FIG. 1C is a diagram illustrating the structure of a next-generation mobile communication system according to an embodiment of the disclosure.

Referring to FIG. 1C, a radio access network of the next-generation mobile communication system may include a next-generation base station (new radio node B (NR NB), hereinafter NR gNB, 1c-10 and a new radio core network (NR CN) or next-generation core network (NG CN) 1c-05). A new radio user equipment (NR UE) or UE 1c-15 accesses an external network via the NR gNB 1c-10 and the NR CN 1c-05.

Referring to FIG. 1C, the NR gNB 1c-10 corresponds to an evolved node B (eNB) of a legacy LTE system. The NR gNB 1c-10 is connected to the NR UE 1c-15 through radio channels and may provide superior services compared to a legacy node B. Since all user traffic data is serviced through shared channels in the next-generation mobile communication system, a device for collating buffer status information of UEs, available transmit power status information, channel status information, etc. and performing scheduling is required and the NR gNB 1c-10 serves as such a device. A single NR gNB 1c-10 generally controls multiple cells. A bandwidth greater than the maximum bandwidth of LTE may be given to achieve an ultrahigh data rate, and beamforming technology may be added to radio access technology such as orthogonal frequency-division multiplexing (hereinafter referred to as OFDM). In addition, adaptive modulation & coding (hereinafter referred to as AMC) is also used to determine a modulation scheme and a channel coding rate in accordance with a channel status of the UE 1c-15. The NR CN 1c-05 performs functions such as mobility support, bearer configuration, quality of service (QoS) configuration, and the like. The NR CN 1c-05 is a device for performing a mobility management function and various control functions for the UE 1c-15 and is connected to a plurality of base stations 1c-10. In addition, the next-generation mobile communication system may cooperate with the legacy LTE system, and the NR CN 1c-05 is connected to an MME 1c-25 through a network interface. The MME 1c-25 is connected to a legacy eNB 1c-30.

Figure 1D:
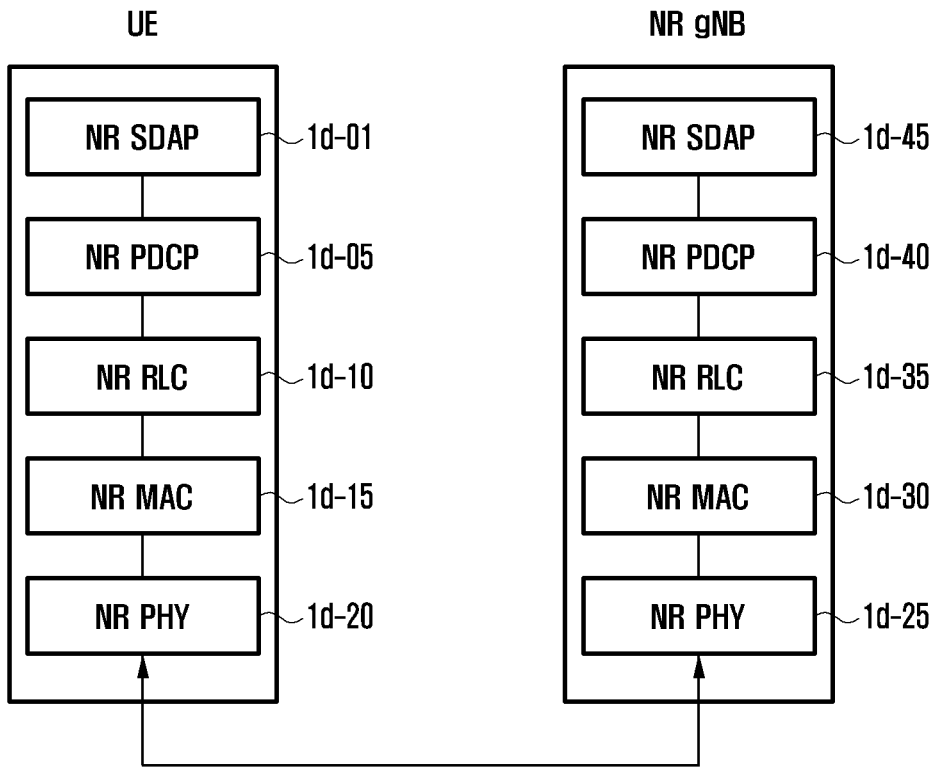
FIG. 1D is a diagram illustrating a radio protocol structure of a next-generation mobile communication system according to an embodiment of the disclosure.

FIG. 1D is a diagram illustrating a radio protocol structure of a next-generation mobile communication system according to an embodiment of the disclosure.

Referring to FIG. 1D, the radio protocol structure of the next-generation mobile communication system includes NR SDAPs 1d-01 and 1d-45, NR PDCPs 1d-05 and 1d-40, NR RLCs 1d-10 and 1d-35, NR MACs 1d-15 and 1d-30, NR PHYs 1d-20 and 1d-25 respectively for a UE and a NR base station.

The main function of the NR SDAP 1d-01 or 1d-45 may include some of the following functions.

Transfer function of user data (transfer of user plane data)

Mapping function between a QoS flow and a DRB for both DL and UL)

Marking function of QoS flow ID for both DL and UL (marking QoS flow ID in both DL and UL packets)

Mapping function of reflective QoS flow to data bearer for UL SDAP PDUs (reflective QoS flow to DRB mapping for the UL SDAP PDUs).

For the SDAP layer device, the UE can be configured with regard to whether to use the header of the SDAP layer device or the function of the SDAP layer device for each PDCP layer device, for each bearer, or for each logical channel through an RRC message, and in case where the SDAP header is configured, the NAS QoS reflection configuration 1-bit indicator (NAS reflective QoS) of the SDAP header and the AS QoS reflection configuration 1-bit indicator (AS reflective QoS) may indicate that the UE can update or reconfigure the QoS flow of uplink and downlink and mapping information for the data bearer. The SDAP header may include QoS flow ID information indicating QoS. The QoS information may be used as data-processing priority, scheduling information, and the like to support smooth service.

The main function of the NR PDCP 1d-05 or 1d-40 may include some of the following functions.

Header compression and decompression functions: ROHC only

Transfer function of user data

In-sequence delivery function (In-sequence delivery of upper layer PDUs)

Out-of-sequence delivery function (Out-of-sequence delivery of upper layer PDUs)

Reordering function (PDCP PDU reordering for reception)

Duplicate detection function (Duplicate detection of lower layer SDUs)

Retransmission function (Retransmission of PDCP SDUs)

Ciphering and deciphering functions

Timer-based SDU discard function (Timer-based SDU discard in uplink.)

In the above, the reordering function of the NR PDCP layer refers to a function of reordering PDCP PDUs received from a lower layer, on a PDCP sequence number (SN) basis and may include a function of delivering the reordered data to an upper layer in order, a function of delivering immediately data without considering the order, a function of recording missing PDCP PDUs by reordering the PDCP PDUs, a function of reporting status information of the missing PDCP PDUs to a transmitter, and a function of requesting to retransmit the missing PDCP PDUs.

The main function of NR RLCs 1d-10 or 1d-35 may include some of the following functions.

Data transfer function (Transfer of upper layer PDUs)

In-sequence delivery function (In-sequence delivery of upper layer PDUs)

Out-of-sequence delivery function (Out-of-sequence delivery of upper layer PDUs)

ARQ function (Error Correction through ARQ)

Concatenation, segmentation and reassembly functions (Concatenation, segmentation and reassembly of RLC SDUs)

Re-segmentation function (Re-segmentation of RLC data PDUs)

Reordering function (Reordering of RLC data PDUs)

Duplicate detection function

Error detection function (Protocol error detection)

RLC SDU discard function

RLC re-establishment function

In the above, the in-sequence delivery function of the NR RLC device refers to a function of delivering RLC SDUs received from a lower layer, to an upper layer in order and may include a function of reassembling multiple RLC SDUs segmented from a RLC SDU and delivering the RLC SDU in case where the segmented RLC SDUs are received, a function of reordering received RLC PDUs on a RLC sequence number (SN) or PDCP SN basis, a function of recording missing RLC PDUs by reordering the RLC PDUs, a function of reporting status information of the missing RLC PDUs to a transmitter, a function of requesting to retransmit the missing RLC PDUs, a function of delivering only RLC SDUs previous to a missing RLC SDU, to the upper layer in order, in case where the missing RLC SDU exists, a function of delivering all RLC SDUs received before a timer is started, to the upper layer in order, although a missing RLC SDU exists, when a certain timer is expired, or a function of delivering all RLC SDUs received up to a current time, to the upper layer in order, although a missing RLC SDU exists, when a certain timer is expired. In addition, the NR RLC device may process the RLC PDUs in order of reception (in order of arrival regardless of sequence numbers) and deliver the RLC PDUs to a PDCP device out of order (out-of-sequence delivery), and reassemble segments received or stored in a buffer, into a whole RLC PDU in case of segment, and then, process and deliver the RLC PDU to the PDCP device. The NR RLC layer may not have a concatenation function, and the concatenation function may be performed by the NR MAC layer or be replaced with a multiplexing function of the NR MAC layer.

In the above, the out-of-sequence delivery function of the NR RLC device refers to a function of delivering the RLC SDUs received from the lower layer, to the upper layer out of order and may include a function of reassembling multiple RLC SDUs segmented from one RLC SDU and delivering the RLC SDU in case where the segmented RLC SDUs are received, or a function of storing RLC SNs or PDCP SNs of received RLC PDUs and recording missing RLC PDUs by ordering the RLC PDUs.

The NR MACs 1d-15 and 1d-30 may be connected to various NR RLC layer devices constituted in a terminal, and the main function of the NR MAC may include some of the following functions.

Mapping function (Mapping between logical channels and transport channels)

Multiplexing and demultiplexing function (Multiplexing/demultiplexing of MAC SDUs)

Scheduling information reporting function

HARQ function (Error correction through HARQ)

Priority handling function between logical channels (Priority handling between logical channels of one UE)

Priority handling function between UEs (Priority handling between UEs by means of dynamic scheduling)

MBMS service identification function

Transport format selection function

Padding function

A NR PHY layer 1d-20 or 1d-25 may channel-code and modulate upper layer data into OFDM symbols and transmit the OFDM symbols through a radio channel, or demodulate OFDM symbols received through a radio channel and channel-decode and deliver the OFDM symbols to an upper layer.

In the following reference drawings and proposed embodiments of the disclosure, an enhancement technique for PSCell addition and change procedure, in particular, conditional PSCell addition and change (conditional PSCell change (CPC) and conditional PSCell addition (CPAC)) procedure is considered. The disclosure propose the methods capable of maintaining corresponding configurations and conditions so that CPAC can be triggered continuously without performing configuration release for candidate secondary node (SN) configured from a base station, even after the SCG change is performed for a previously supported CPAC operation.

Figure 1E:
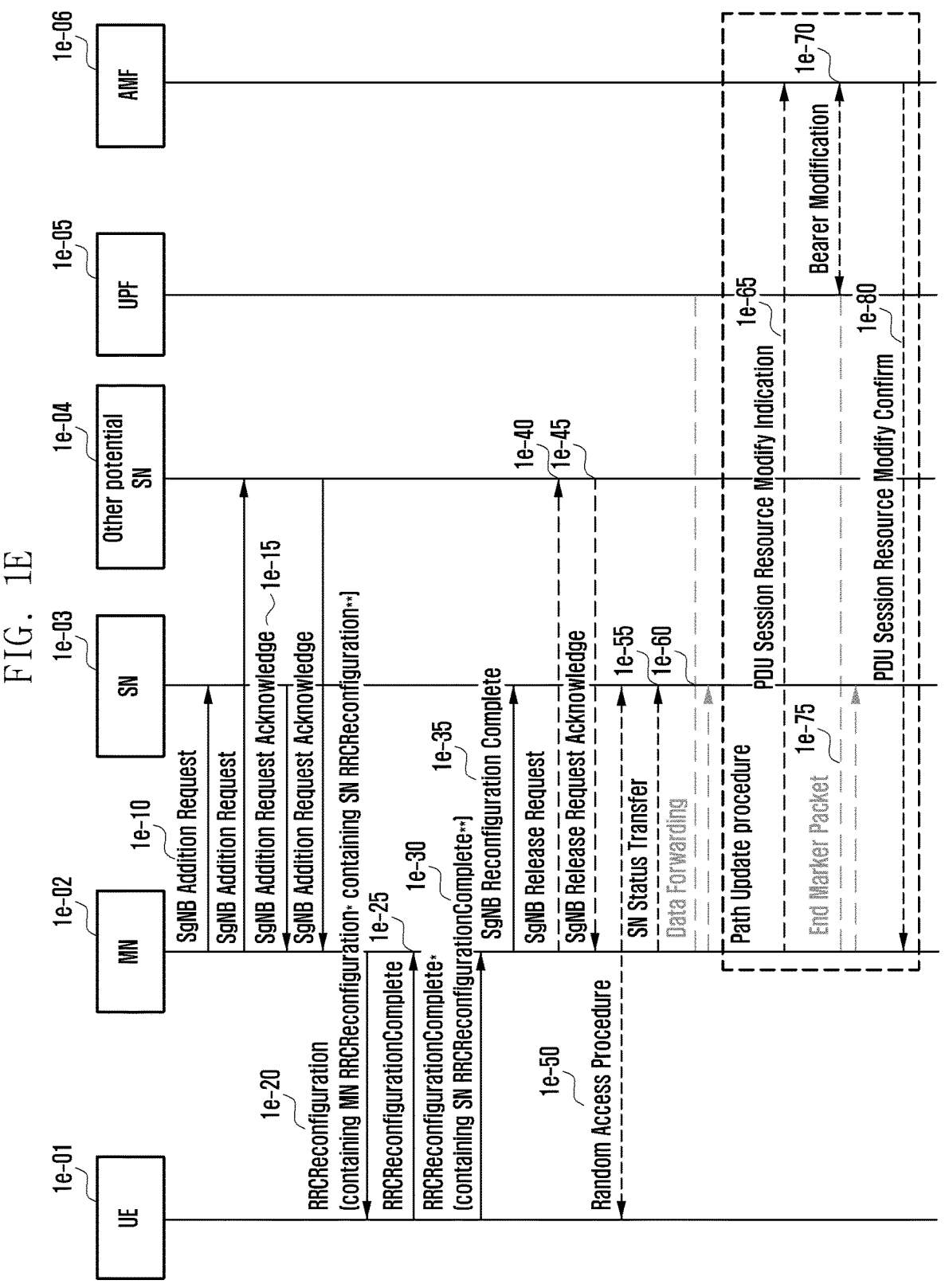
FIG. 1E is a diagram illustrating an overall operation of performing a conditional PSCell addition procedure in an LTE system or an NR system according to an embodiment of the disclosure.

FIG. 1E is a diagram illustrating an overall operation of performing a conditional PSCell addition procedure in an LTE system or an NR system according to an embodiment of the disclosure.

Referring to FIG. 1E, a UE 1e-01 in an RRC connection state performs data transmission/reception and channel measurement/report operations according to the configurations of the connected master node (MN)/master base station/MN base station 1e-02. The MN base station 1e-02 may identify a need to add the SN/SN node/SN base station for the UE configuration included in the RRC configuration, up to 8 SN CPA configurations may be provided through Conditional-Reconfiguration as shown in Table 1 below. For reference, the corresponding configurations are the same as the maximum number of configurations related to MN conditional handover (CHO) and SN CPAC, and the base station may configure up to 8 configurations in consideration of both MN CHO and SN CPAC. Among the SN CPAC related configurations, condReconfigId means the index of the corresponding SN CPAC configuration, and the SN CPAC configuration corresponding to the corresponding condReconfigId may include the condition (condExecutionCond) for SN CPA indicated by measId and condRRCReconfig including the SCG configuration to be applied after the UE performs SN CPA. The condition (condExecutionCond) for SN CPA can include up to two trigger conditions, and one RS type and up to two different trigger quantities (e.g., RSRP and RSRQ, RSRP and SINR, etc.) can be provided as the condition.

TABLE 1

```
ConditionalReconfiguration-r16 ::=          SEQUENCE {
    attemptCondReconfig-r16                         ENUMERATED   {true}
OPTIONAL,   -- Cond CHO
    condReconfigToRemoveList-r16                    CondReconfigToRemoveList-r16
OPTIONAL,   -- Need N
    condReconfigToAddModList-r16                    CondReconfigToAddModList-r16
OPTIONAL,   -- Need N
    ...

CondReconfigToAddModList-r16 ::=          SEQUENCE (SIZE (1.. maxNrofCondCells-r16))
OF CondReconfigToAddMod-r16
CondReconfigToAddMod-r16 ::=              SEQUENCE {
    condReconfigId-r16                          CondReconfigId-r16,
    condExecutionCond-r16                       SEQUENCE (SIZE (1..2)) OF MeasId
OPTIONAL,   -- Need M
    condRRCReconfig-r16                              OCTET STRING (CONTAINING
RRCReconfiguration)                     OPTIONAL,     -- Cond condReconfigAdd
    ...,
    [[
    condExecutionCondSCG-r17                        OCTET STRING (CONTAINING
CondReconfigExecCondSCG-r17) OPTIONAL        -- Need M
    ]]
}
CondReconfigExecCondSCG-r17 ::=          SEQUENCE (SIZE (1..2)) OF MeasId
```

1e-01, and identify with the SN nodes 1e-03 and 1e-04 that can be candidates whether SN addition can be performed for the UE 1e-01. The corresponding procedure may be performed through SgNB Addition Request transmission/reception procedure (in operation 1e-10) and SgNB Addition Request Acknowledge transmission/reception procedure (in operation 1e-15) between the MN base station 1e-02 and the respective SN nodes 1e-03 and 1e-04. In operation 1e-20, the MN base station 1e-02 may include the CPA related configuration (condition for CPA and SCG related RRC configuration) received from candidate SNs 1e-03 and 1e-04 that allow the SN addition in operations 1e-10/1e-15 in a RRC configuration message of the MN base station 1e-02 and transmit the same to the UE 1e-01. Depending on an embodiment, the CPA related configuration for the SNs 1e-03 and 1e-04 is encapsulated in an RRCConnectionReconfiguration message in an EN-DC situation, and the CPA related configuration for the SNs 1e-03 and 1e-04 is encapsulated in an RRCReconfiguration message in NE-DC and NR-DC situations, and the same can be transmitted to the UE 1e-01. Referring to FIG. 1E, the case of NR-DC will be assumed and described. However, it will be apparent to those skilled in the art that this embodiment can be similarly applied to EN-DC and NE-DC. As for the SN CPA related In operation 1e-25, the UE 1e-01 may transmit an RRCReconfigurationComplete message to the MN base station 1e-02 in response to the received RRC configuration (including the configuration for MN and SN, especially CPA related configuration). Then, in case where the CPA related condition received from a predetermined SN 1e-03 is satisfied, the UE 1e-01 may trigger the SN addition procedure for the corresponding SN 1e-03. That is, in operation 1e-30, the UE 1e-01 may generate an MN RRCReconfigurationComplete including the SN RRCReconfigurationComplete message for the SN 1e-03 for which the SN addition procedure is triggered (the SN for which the CPA condition is satisfied), and transmit the same to the MN base station 1e-02. In operation 1e-35, the MN base station 1e-02 may transmit the SgNB Reconfiguration Complete message to the SN base station 1e-03 for which the corresponding CPA condition is satisfied, that is, the SN base station 1e-03 to which the UE 1e-01 performs the SN addition, and notify the SN addition operation of the UE 1e-01. In addition, in operation 1e-40, the MN base station 1e-02 may transmit, to the candidate SN base stations 1e-04 to which the SN has not been added, a SgNB Release Request message indicating the release of the SCG configuration transmitted to the UE 1e-01. In operation 1e-45, the respective candidate SNs 1e-04 may transmit a SgNB Release Request Acknowledge to the MN base station 1e-02 in response to the message. The procedures in operations 1e-40 and 1e-45 may be omitted depending on implementations.

In operation 1e-50, the UE 1e-01 may perform a random access procedure for adding an SN to the SN 1e-03 for which CPA is triggered. This operation can be performed only in the case where the update of security key is required, and can be omitted in other cases. In operation 1e-55, the MN base station 1e-02 may transmit the sequence number (SN) status to the SN base station 1e-03, and may perform a procedure for transmitting (forwarding) the data from the UPF 1e-05 to the SN base station 1e-03 in operation 1e-60. In addition, the MN base station 1e-02 may transmit a PDU session resource change indicator to an AMF 1e-06 as an operation for path update in operation 1e-65, the AMF 1e-06 and the UPF 1e-05 may perform the bearer modification procedure in operation 1e-70, and the UPF 1e-05 may transmit the PDU packet including an end marker to the MN base station 1e-02 in operation 1e-75 to indicate the change of a previous bearer. In operation 1e-80, the AMF 1e-06 may transmit a PDU session resource change identification message indicating that the PDU session resource change has been completed to the MN base station 1e-02.

Figure 1F:
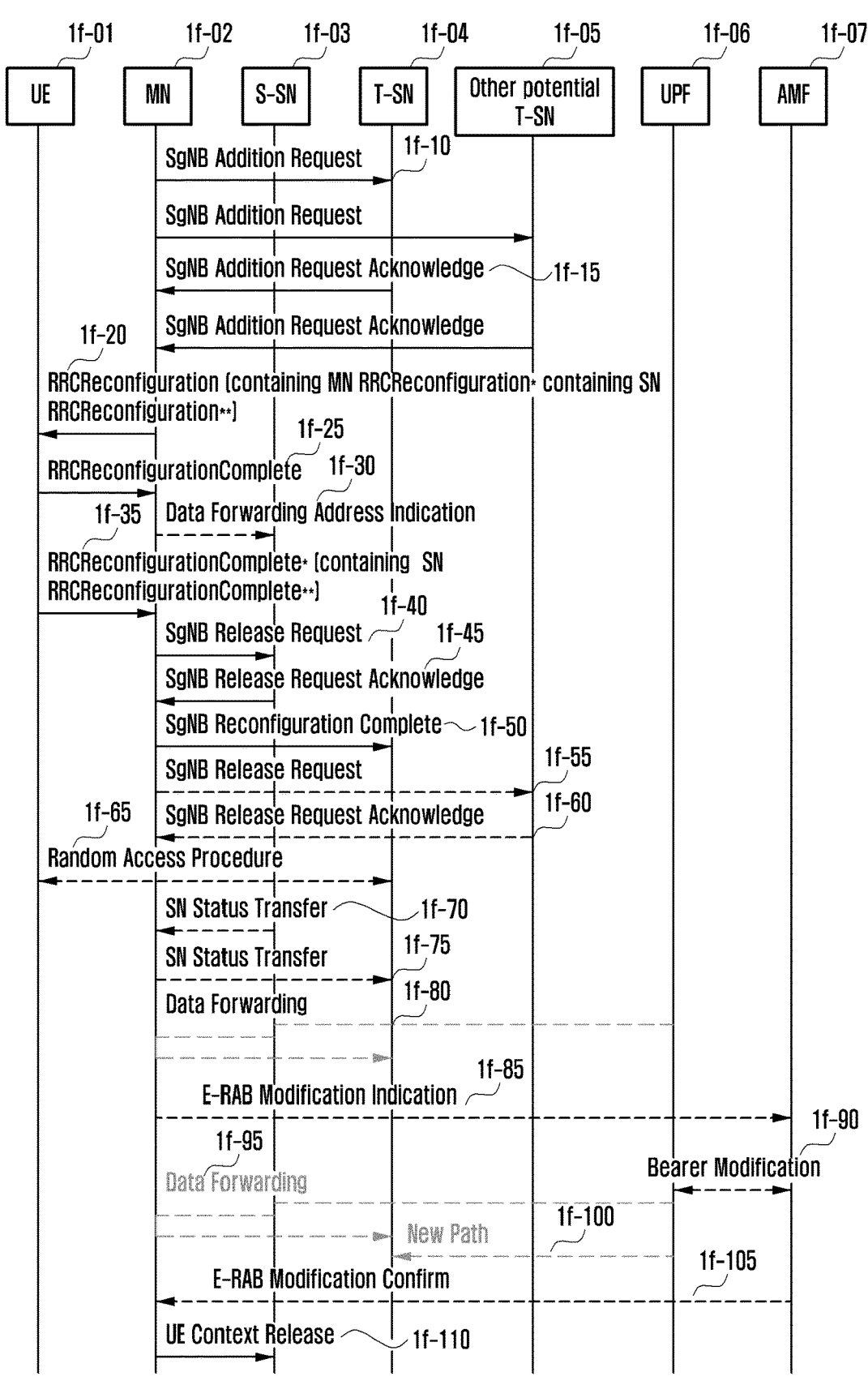
FIG. 1F is a diagram illustrating an overall operation of performing a conditional PSCell change procedure in an LTE system or an NR system according to an embodiment of the disclosure.

FIG. 1F is a diagram illustrating an overall operation of performing a conditional PSCell change procedure in an LTE system or an NR system according to an embodiment of the disclosure.

Referring to FIG. 1F, a UE 1f-01 in an RRC connection state performs data transmission/reception and channel measurement/report operations according to the configurations of the connected master node (MN)/master base station/MN base station 1f-02. The MN base station 1f-02 may identify a need to change the current source SN base station 1f-03 to other SN base stations 1f-04 and 1f-05 for the UE 1f-01, and identify with the SN nodes 1f-04 and 1f-05 that can be candidates whether the SN changes can be performed form the UE 1f-01. The corresponding procedure may be performed through SgNB Addition Request transmission/reception procedure (in operation 1f-10) and SgNB Addition Request Acknowledge transmission/reception procedure (in operation 1f-15) between the MN base station 1f-02 and the respective SN nodes 1f-04 and 1f-05. In operation 1f-20, the MN base station 1f-02 may include the CPC related configuration (condition for CPC and SCG related RRC configuration) received from candidate SNs 1f-04 and 1f-05 that allow the SN addition and change in operations 1f-10/1f-15 in a RRC configuration message of the MN base station 1f-02 and transmit the same to the UE 1f-01. Depending on an embodiment, the CPA related configuration for the SNs 1f-04 and 1f-05 is encapsulated in an RRCConnectionReconfiguration message in an EN-DC situation, and the CPC related configuration for the SNs 1f-04 and 1f-05 is encapsulated in an RRCReconfiguration message in NE-DC and NR-DC situations, and the same can be transmitted to the UE 1f-01. Referring to FIG. 1F, the case of NR-DC will be assumed and described. However, it will be apparent to those skilled in the art that this embodiment can be similarly applied to EN-DC and NE-DC. As for the SN CPC related configuration included in the RRC configuration, up to 8 SN CPC configurations may be provided through Conditional-Reconfiguration as shown in Table 2 below. For reference, the corresponding configurations are the same as the maximum number of configurations related to MN CHO and SN CPC, and the base station may configure up to 8 configurations in consideration of both MN CHO and SN CPC. Among the SN CPC related configurations, condReconfigId means the index of the corresponding SN CPC configuration, and the SN CPC configuration corresponding to the corresponding condReconfigId may include the condition (condExecutionCond) for SN CPC indicated by measId and condRRCReconfig including the SCG configuration to be applied after the UE performs SN CPC. The condition (condExecutionCond) for SN CPC can include up to two trigger conditions, and one RS type and up to two different trigger quantities (e.g., RSRP and RSRQ, RSRP and SINR, etc.) can be provided as the condition.

TABLE 2

| | |
|---|---|
| ConditionalReconfiguration-r16 ::= | SEQUENCE { |
|   attemptCondReconfig-r16 | ENUMERATED {true} |
| OPTIONAL, -- Cond CHO | |
|   condReconfigToRemoveList-r16 | CondReconfigToRemoveList-r16 |
| OPTIONAL, -- Need N | |
|   condReconfigToAddModList-r16 | CondReconfigToAddModList-r16 |
| OPTIONAL, -- Need N | |
| ... | |
| CondReconfigToAddModList-r16 ::= | SEQUENCE (SIZE (1.. maxNrofCondCells-r16)) |
| OF CondReconfigToAddMod-r16 | |
| CondReconfigToAddMod-r16 ::= | SEQUENCE { |
|   condReconfigId-r16 | CondReconfigId-r16, |
|   condExecutionCond-r16 | SEQUENCE (SIZE (1..2)) OF MeasId |
| OPTIONAL, -- Need M | |
|   condRRCReconfig-r16 | OCTET STRING (CONTAINING |
| RRCReconfiguration) | OPTIONAL, -- Cond condReconfigAdd |
|   ..., | |
|   [[ | |
|   condExecutionCondSCG-r17 | OCTET STRING (CONTAINING |
| CondReconfigExecCondSCG-r17) OPTIONAL | -- Need M |
|   ]] | |
| } | |
| CondReconfigExecCondSCG-r17 ::= | SEQUENCE (SIZE (1..2)) OF MeasId |

In operation 1*f*-25, the UE 1*f*-01 may transmit an RRCReconfigurationComplete message to the MN base station 1*f*-02 in response to the received RRC configuration (including the configuration for MN and SN, especially CPC related configuration). In addition, the UE 1*f*-01 may indicate a data forwarding address to the source SN base station 1*f*-03 in operation 1*f*-30. Depending on an embodiment, the corresponding operation may be omitted.

Then, in case where the CPC related condition received from a predetermined SN 1*f*-04 is satisfied, the UE 1*f*-01 can trigger the SN change procedure for the corresponding SN 1*f*-04.

That is, in operation 1*f*-35, the UE 1*f*-01 may generate an MN RRCReconfigurationComplete message including the SN RRCReconfigurationComplete message for the SN 1*f*-04 for which the SN change procedure is triggered (the SN for which the CPC condition is satisfied), and transmit the same to the MN base station 1*f*-02. The MN base station 1*f*-02 may transmit a SgNB Release Request message requesting SCG configuration release to the source SN base station 1*f*-03 in operation 1*f*-40, and in operation 1*f*-45, the source SN base station 1*f*-03 may respond to the request by transmitting a SgNB Release Request Acknowledge message to the MN base station 1*f*-02. In operation 1*f*-50, the MN base station 1*f*-02 may transmit the SgNB Reconfiguration Complete message to the target SN base station 1*f*-04 for which the corresponding CPC condition is satisfied, that is, the target SN base station 1*f*-04 to which the UE 1*f*-01 performs the SN change, and notify the SN change operation of the UE 1*f*-01. In addition, in operation 1*f*-55, the MN base station 1*f*-02 may transmit, to the candidate SN base stations 1*f*-05 to which the SN has not been changed, a SgNB Release Request message indicating the release of the SCG configuration transmitted to the UE 1*f*-01. Also, in operation 1*f*-60, the respective candidate SN base stations 1*f*-05 may transmit a SgNB Release Request Acknowledge to the MN base station 1*f*-02 in response to the message. Procedures 1*f*-55 and 1*f*-60 may be omitted depending on implementations.

In operation 1*f*-65, the UE 1*f*-01 may perform a random access procedure for SN change with respect to the target SN base station 1*f*-04 for which CPC is triggered. This operation can be performed only in the case where the update of security key is required, and can be omitted in other cases. In operation 1*f*-70, the MN base station 1*f*-02 may receive the sequence number (SN) status from the source SN base station 1*f*-03, and may transmit the received SN status to the target SN base station 1*f*-04 in operation 1*f*-75. In operation 1*f*-80, the MN base station 1*f*-02 may perform a procedure for transmitting (forwarding) the data from the UPF 1*f*-06 to the target SN base station 1*f*-04. In addition, the MN base station 1*f*-02 may transmit a PDU session resource change indicator to an AMF 1*f*-07 as an operation for path update in operation 1*f*-85, the AMF 1*f*-07 and the UPF 1*f*-06 may perform the bearer modification procedure in operation 1*f*-90, and the UPF 1*f*-05 may transmit the PDU packet including an end marker to the MN base station 1*f*-02 in operation 1*f*-95 to indicate the change of a previous bearer. In operation 1*f*-100, the UPF 1*f*-06 may indicate a new path to the target SN base station 1*f*-04. In operation 1*f*-105, the AMF 1*f*-07 may transmit a PDU session resource change identification message indicating that the PDU session resource change has been completed to the MN base station 1*f*-02. In operation 1*f*-110, the MN base station 1*f*-02 may instruct the source SN base station 1*f*-03 to release the UE context.

Figure 1G:
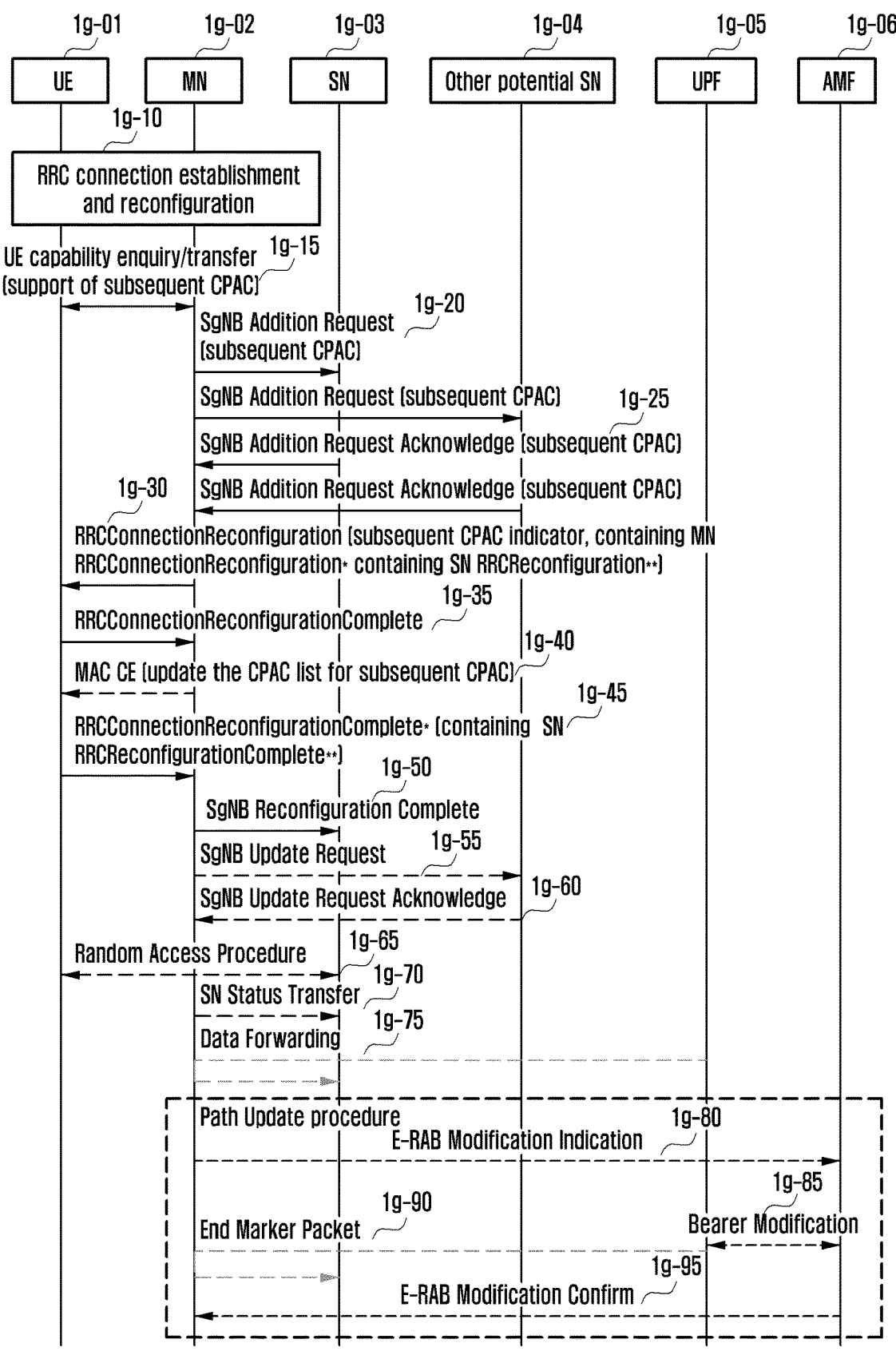
FIG. 1G is a diagram illustrating an overall operation of continuously performing a conditional PSCell addition procedure according to a first embodiment of the disclosure.

FIG. 1G is a diagram illustrating an overall operation of continuously performing a conditional PSCell addition procedure according to a first embodiment of the disclosure.

Referring to FIG. 1G, a UE 1*g*-01 performs an RRC connection establishment procedure with a Master Node (MN)/master base station/MN base station 1*g*-02 in operation 1*g*-10, and performs RRC configuration. In operation 1*g*-15, the UE 1*g*-01 and the MN base station 1*g*-02 may transmit and receive UE capability request (UECapabilityEnquiry) and UE capability information (UECapabilityInformation) messages to request UE capability and transmit UE capability information. Through this procedure, the MN base station 1*g*-02 may identify the capability of the UE 1*g*-01. It is characterized in that the corresponding UE capability includes an indicator indicating whether the UE 1*g*-01 supports continuous CPAC. The UE capability may be transmitted using one of the feature set methods for each UE, each band, or each band combination, and may be transmitted separately for CPA and CPC.

In operation 1*g*-20, the MN base station 1*g*-02 may identify the need to add an SN to the UE 1*g*-01, and identify with the SN nodes 1*g*-03 and 1*g*-04 that can be candidates whether SN addition can be performed for the UE 1*g*-01. The corresponding procedure may be performed through the SgNB Addition Request transmission/reception procedure (in operation 1*g*-20) and the SgNB Addition Request Acknowledge transmission/reception procedure (in operation 1*g*-25) between the MN base station 1*g*-02 and the respective SN nodes 1*g*-03 and 1*g*-04. Depending on an embodiment, content for identifying whether continuous CPAC application is possible may be added in the above procedure. That is, continuous CPAC application identification indicator and identification indicator may be included in the SgNB Addition Request and the SgNB Addition Request Acknowledge. Alternatively, continuous CPAC application identification indicator and identification indicator may be included in the RRC inter-node messages (CG-Config and CG-ConfigInfo) rather than the above Xn message exchange procedure.

In operation 1*g*-30, the MN base station 1*g*-02 may include CPAC related configuration (condition for CPAC and SCG related RRC configuration) received from the candidate SNs 1*g*-03 and 1*g*-04 that allow the UE 1*g*-01 to add SNs in operations 1*g*-20/1*g*-25 in an RRC configuration message, and transmit the same to the UE 1*g*-01. Depending on an embodiment, the CPAC related configuration for the SN is encapsulated in an RRCConnectionReconfiguration message in an EN-DC situation, and the CPAC related configuration for the SN is encapsulated in an RRCReconfiguration message in NE-DC and NR-DC situations, and the same can be transmitted to the UE 1*g*-01. Referring to FIG. 1G, the case of NR-DC will be assumed and described. However, it will be apparent to those skilled in the art that this embodiment can be similarly applied to EN-DC and NE-DC. As for the SN CPAC related configuration included in the RRC configuration, up to 8 SN CPAC configurations may be provided through ConditionalReconfiguration as shown below. For reference, the corresponding configurations are the same as the maximum number of configurations related to MN conditional handover (CHO) and SN CPAC, and the base station may configure up to 8 configurations in consideration of both MN CHO and SN CPAC. Among the SN CPAC related configurations, condReconfigId means the index of the corresponding SN CPAC configuration, and the SN CPAC configuration corresponding to the corresponding condReconfigId may include the condition (condExecutionCond) for SN CPAC indicated by measId and condRR- CReconfig including the SCG configuration to be applied after the UE performs SN CPAC. The condition (condExecutionCond) for SN CPA can include up to two trigger conditions, and one RS type and up to two different trigger quantities (e.g., RSRP and RSRQ, RSRP and SINR, etc.) can be provided as the condition.

In addition, when the base station 1g-02 transmits CPAC related configuration (conditions for SN CPAC, SCG configuration applied after performing SN CPAC, etc.) to the UE 1g-01, the base station 1g-02 may include an indicator indicating that a continuous CPAC operation is supported (for example, the following subsequentCG-Change field) in a corresponding CPAC operation and transmit the same. The UE 1g-01 that receives the corresponding indicator may keep/store/maintain related CPAC configuration even after SCG change. That is, the UE 1g-01 does not release the received CPAC configuration, continues to identify the stored CPAC conditions even after the SCG change, and if satisfied, triggers the CPC and performs the CPC operation from a previous PSCell to a target PSCell. The corresponding operation may be continued until a separate release command for a continuous CPAC operation is transmitted from the base station 1g-02. There may be various methods for notifying that the base station 1g-02 supports the continuous CPAC operation, and the disclosure proposes the following methods.

1. Option 1: A method for notifying that continuous CPAC is supported through an RRC message and indicating to the UE 1g-01 extending the same, or indicating whether to enable the corresponding operation by introducing a new field in another IE in the MN RRCReconfiguration.

The corresponding field may also be used as whether to activate/deactivate continuous CPAC operation (e.g., enabled/disabled, activate/deactivate), and according to an embodiment, in case where the corresponding field signaling is absent, it may indicate that the CPAC operation is deactivated.

Signaling is possible in the form of ENUMERATE {activate, deactivate}

2) Option 1-2: A method for notifying each SN to which the CPAC configuration provided by the base station 1g-02 is applied individually that continuous CPAC is supported.

Refer to Option 1-2 signaling method in Table 3 below (subsequentCG-Change-r18; ENUMERATED {reserved, unreserved})

Signaling by adding a field for the corresponding information to CondReconfigToAddMod-r16 IE and extending the same, and indicating whether to enable the corresponding operation. That is, the UE identifies whether continuous CPAC is applied for each CPAC configuration, and stores/keeps/maintains it according to the related configuration (the corresponding configuration is not released even after SCG change)

Separate signaling indicating whether to activate/deactivate continuous CPAC operation may be used for all CPAC configurations other than the corresponding field, and the signaling introduced in option 1-1 may be applied.

TABLE 3

```
ConditionalReconfiguration-r16 ::=          SEQUENCE {
    attemptCondReconfig-r16                             ENUMERATED  {true}
OPTIONAL,      -- Cond CHO
    condReconfigToRemoveList-r16                        CondReconfigToRemoveList-r16
OPTIONAL,      -- Need N
    condReconfigToAddModList-r16                        CondReconfigToAddModList-r16
OPTIONAL,      -- Need N ...,
    // Option 1-1
    [[               subsequentCG-Change-r18            ENUMERATED  {enabled}
OPTIONAL    -- Need R
    ]]
CondReconfigToAddModList-r16 ::=            SEQUENCE (SIZE (1.. maxNrofCondCells-r16))
OF CondReconfigToAddMod-r16
CondReconfigToAddMod-r16 ::=               SEQUENCE {
    condReconfigId-r16                          CondReconfigId-r16,
    condExecutionCond-r16                          SEQUENCE (SIZE (1..2)) OF MeasId
OPTIONAL,      -- Need M
    condRRCReconfig-r16                              OCTET STRING (CONTAINING
RRCReconfiguration)       OPTIONAL,       -- Cond condReconfigAdd ...,
    [[
    condExecutionCondSCG-r17                         OCTET STRING (CONTAINING
CondReconfigExecCondSCG-r17) OPTIONAL       -- Need M
    ]],
        // Option 1-2
        [[             subsequentCG-Change-r18            ENUMERATED  {reserved,
unreserved}              OPTIONAL,       -- Need R
        ]]
}
CondReconfigExecCondSCG-r17 ::=         SEQUENCE (SIZE (1..2)) OF MeasId
```

1) Option 1-1: A method for notifying that continuous CPAC is commonly supported for CPAC configuration for all SNs provided by the base station 1g-02.

Refer to Option 1-1 signaling method in Table 3 below (subsequentCG-Change-r18; ENUMERATE {enable})

Signaling by adding a field for the corresponding information to ConditionalReconfiguration-r16 IE and 2. Option 2: Method for indicating continuous CPAC operation and update of applied configuration through MAC CE signaling Introduction of MAC CE with new logical channel ID (LCID) or extended LCID (eLCID)

Includes a field indicating activation/deactivation of continuous CPAC operation (a method for applying the corresponding field to the entire CPAC configuration or an individual CPAC configuration is possible). A detailed MAC CE structure is illustrated in FIG. 1I.

Can be additionally applied to the RRC signaling method of option 1 above

For the purpose of signaling an update for continuous CPAC operation by reducing latency and reducing signaling in case where there is a need to change whether or not to support SN CPAC operation based on inter-node RRC message with SN and negotiation through Xn interface.

As described above, option 2 above may be used in operation 1g-40, and may be omitted in case where the RRC configuration is replaced and used (repetition of operations 1g-30/1g-35).

In operation 1g-35, the UE 1g-01 may transmit an RRCReconfigurationComplete message to the MN base station 1g-02 in response to the received RRC configuration (including the configuration for MN and SN, especially CPAC related configuration). Then, in case where the CPAC related condition received from a predetermined SN 1g-03 is satisfied, the UE 1g-01 may trigger the SN addition procedure for the corresponding SN 1g-03. That is, in operation 1g-45, the UE 1g-01 may generate an MN RRCReconfigurationComplete including the SN RRCReconfigurationComplete message for the SN for which the SN addition procedure is triggered (the SN for which the CPA condition is satisfied), and transmit the same to the MN base station 1g-02. In operation 1g-50, the MN base station 1g-02 may transmit the SgNB Reconfiguration Complete message to the SN base station 1g-03 for which the corresponding CPA condition is satisfied, that is, the SN base station 1g-03 to which the UE 1g-01 performs the SN addition, and notify the SN addition operation of the UE 1g-01. In addition, in operation 1g-55, the MN base station 1g-02 may perform a procedure for identifying the validity of the CPAC configuration transmitted to the UE 1g-01, with respect to the candidate SN base stations 1g-04 to which the SN has not been added, That is, in operation 1g-55, the MN base station 1g-02 may request the candidate SN base stations 1g-04 whether the previously provided (continuous) CPAC configuration is valid even after the SCG change or whether the previously provided (continuous) CPAC configuration needs to be updated. The corresponding message may be a SgNB update request message or another Xn message, or may be an RRC inter-node message. In operation 1g-60, each of the candidate SNs 1g-04 transmits, to the MN base station 1g-01, a SgNB update request acknowledge or RRC inter-node message including (continuous) CPAC configuration update information in response to the message. The procedures in operations 1g-55 and 1g-60 may be omitted depending on implementations. In addition, the continuous CPAC operation that can be repeatedly performed thereafter is omitted in FIG. 1G, but the UE 1g-01 may perform related operations (CPC trigger and CPC execution) by continuously applying the received CPAC configuration.

In operation 1g-65, the UE 1g-01 may perform a random access procedure for adding an SN to the SN 1g-03 for which CPA is triggered. This operation may be performed only in the case where the update of security key is required, and may be omitted in other cases. In operation 1g-70, the MN base station 1g-02 may transmit the sequence number (SN) status to the SN base station 1g-03, and may perform a procedure for transmitting (forwarding) the data from the UPF 1g-05 to the SN base station 1g-03 in operation 1g-75. In addition, the MN base station 1g-02 may transmit a PDU session resource change indicator to an AMF 1g-06 as an operation for path update in operation 1g-80, the AMF 1g-06 and the UPF 1g-05 may perform the bearer modification procedure in operation 1g-85, and the UPF 1g-05 may transmit the PDU packet including an end marker to the MN base station 1g-02 in operation 1g-90 to indicate the change of a previous bearer. In operation 1g-95, the AMF 1g-06 may transmit a PDU session resource change identification message indicating that the PDU session resource change has been completed to the MN base station 1g-02.

Figure 1H:
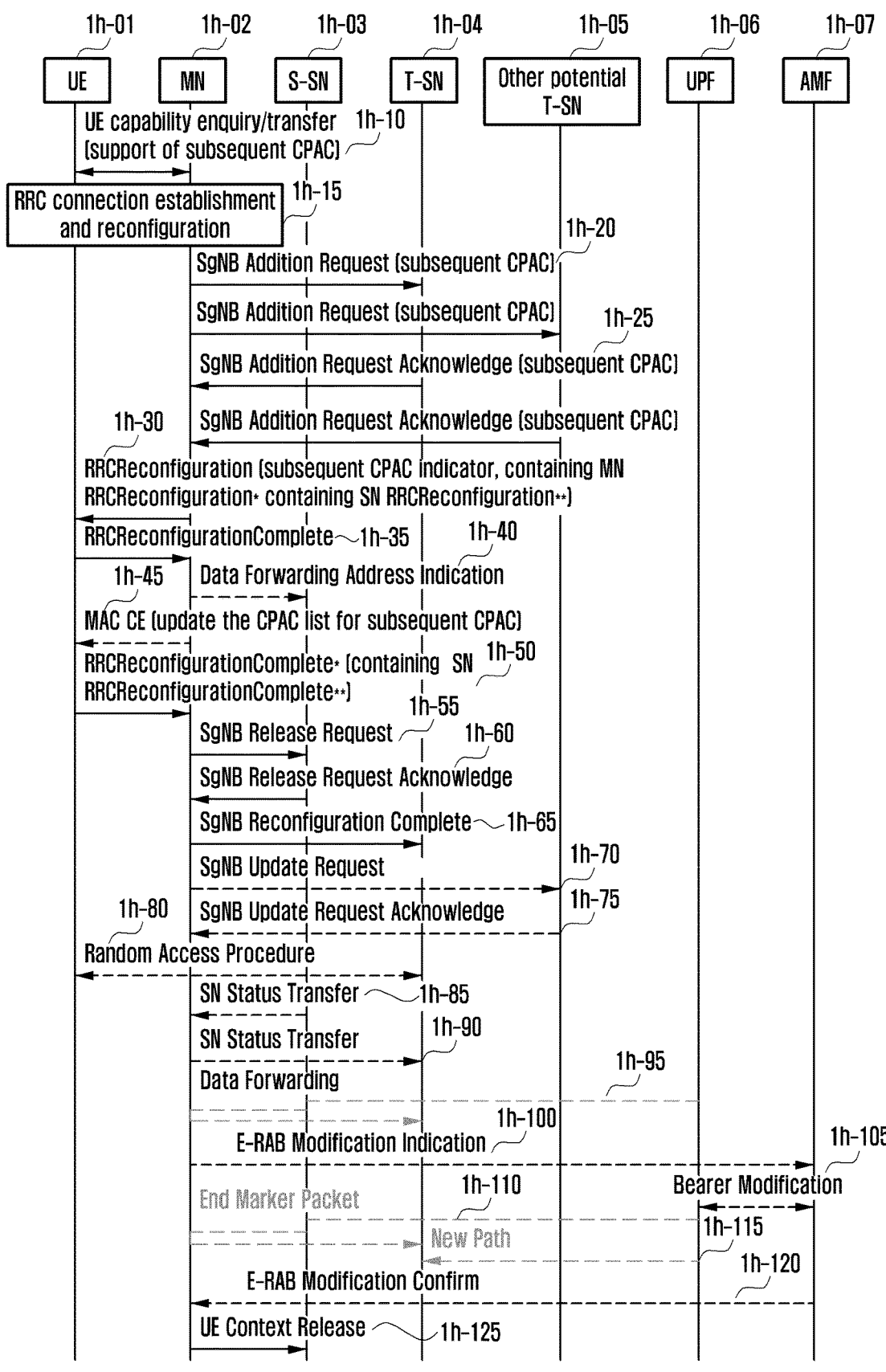
FIG. 1H is a diagram illustrating an overall operation of continuously performing a conditional PSCell change procedure according to a second embodiment of the disclosure.
Figure 1I:
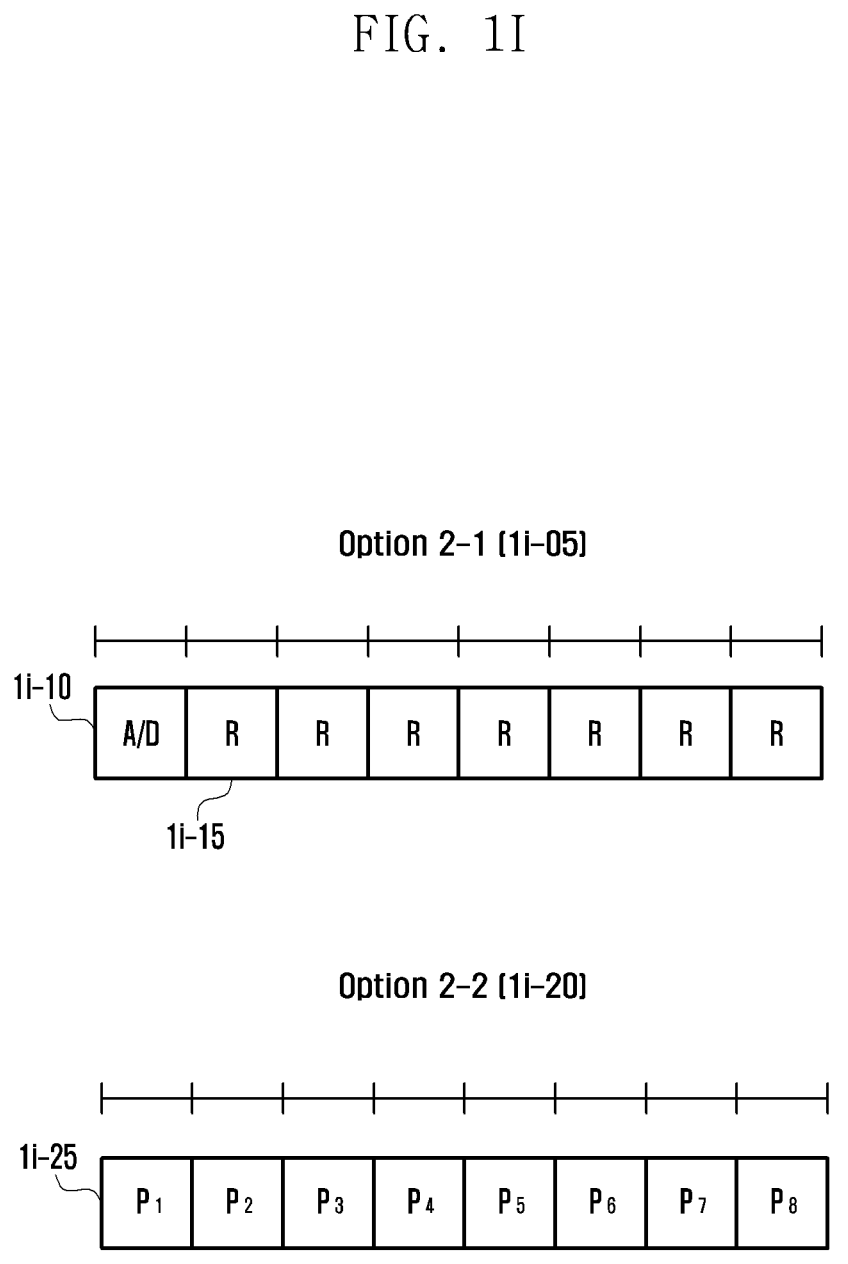

FIG. 1H is a diagram illustrating an overall operation of continuously performing a conditional PSCell change procedure according to an embodiment of the disclosure.

Referring to FIG. 1H, in operation 1h-10, the UE 1h-01 and the MN base station/MN node/master base station 1h-02 in the RRC connection state perform a procedure for requesting UE capability and transmitting UE capability information through UE capability request (UECapabilityEnquiry) and UE capability information (UECapabilityInformation) messages. Through this procedure, the MN base station 1h-02 may identify the capability of the UE 1h-01. It is characterized in that the corresponding UE capability includes an indicator indicating whether the UE 1h-01 supports continuous CPAC. The UE capability may be transmitted using one of the feature set methods for each UE, each band, or each band combination, and may be transmitted separately for CPA and CPC. The UE 1h-01 may receive RRC configuration from the MN base station 1h-02 in operation 1h-15, and may be provided with basic configuration. In the embodiment illustrated in FIG. 1H of the disclosure it is assumed that dual connectivity (DC) with the source SN 1h-03 is established in the above operation.

In operation 1h-20, the MN base station 1h-02 may identify the need to change an SN for the UE 1h-01, and identify with the SN nodes 1h-04 and 1h-05 that can be candidates whether SN change can be performed for the UE 1h-01. The corresponding procedure may be performed through the SgNB Addition Request transmission/reception procedure (in operation 1h-20) and the SgNB Addition Request Acknowledge transmission/reception procedure (in operation 1h-25) between the MN base station 1h-02 and the respective SN nodes 1h-04 and 1h-05. Depending on an embodiment, content for identifying whether continuous CPAC application is possible may be added in the above procedure. That is, continuous CPAC application identification indicator and identification indicator may be included in the SgNB Addition Request and the SgNB Addition Request Acknowledge. Alternatively, continuous CPAC application identification indicator and identification indicator may be included in the RRC inter-node messages (CG-Config and CG-ConfigInfo) rather than the above Xn message exchange procedure.

In operation 1h-30, the MN base station 1h-02 may include CPAC related configuration (condition for CPAC and SCG related RRC configuration) received from the candidate SNs 1h-04 and 1h-05 that allow the UE 1h-01 to change the SN in a RRC configuration message in operations 1h-20/1h-25, and transmit the same to the UE 1h-01. Depending on an embodiment, the CPAC related configuration for the SN is encapsulated in an RRCConnectionReconfiguration message in an EN-DC situation, and the CPAC related configuration for the SN is encapsulated in an RRCReconfiguration message in NE-DC and NR-DC situations, and the same can be transmitted to the UE 1h-01. In the drawing, the case of NR-DC will be assumed and described. However, it will be apparent to those skilled in the art that this embodiment can be similarly applied to EN-DC and NE-DC. As for the SN CPAC related configuration included in the RRC configuration, up to 8 SN CPAC configurations may be provided through ConditionalReconfiguration as shown below. For reference, the corresponding configurations are the same as the maximum number of configurations related to MN CHO and SN CPAC, and the base station may configure up to 8 configurations in consideration of both MN CHO and SN CPAC. Among the SN CPAC related configurations, condReconfigId means the index of the corresponding SN CPAC configuration, and the SN CPAC configuration corresponding to the corresponding condReconfigId may include the condition (condExecutionCond) for SN CPAC indicated by measId and condRRCReconfig including the SCG configuration to be applied after the UE performs SN CPAC. The condition (condExecutionCond) for SN CPA can include up to two trigger conditions, and one RS type and up to two different trigger quantities (e.g., RSRP and RSRQ, RSRP and SINR, etc.) can be provided as the condition.

In addition, when the base station 1h-02 transmits CPAC related configuration (conditions for SN CPAC, SCG configuration applied after performing SN CPAC, etc.) to the UE 1h-01, the base station 1h-02 may include an indicator indicating that a continuous CPAC operation is supported (for example, the following subsequentCG-Change field) in a corresponding CPAC operation and transmit the same. The UE 1h-01 that receives the corresponding indicator may keep/store/maintain related CPAC configuration even after SCG change. That is, the UE 1h-01 does not release the received CPAC configuration, continues to identify the stored CPAC conditions even after the SCG change, and if satisfied, triggers the CPC and performs the CPC operation from a previous PSCell to a target PSCell. The corresponding operation may be continued until a separate release command for a continuous CPAC operation is transmitted from the base station 1h-02. There may be various methods for notifying that the base station 1h-02 supports the continuous CPAC operation, and the disclosure proposes the following methods.

1. Option 1: A method for notifying that continuous CPAC is supported through an RRC message and indicating to the UE 1h-01

1) Option 1-1: A method for notifying that continuous CPAC is commonly supported for CPAC configuration for all SNs provided by the base station 1h-02.

Refer to Option 1-1 signaling method in Table 4 below (subsequentCG-Change-r18; ENUMERATE {enable})

Signaling by adding a field for the corresponding information to ConditionalReconfiguration-r16 IE and extending the same, or indicating whether to enable the corresponding operation by introducing a new field in another IE in the MN RRCReconfiguration.

The corresponding field may also be used as whether to activate/deactivate continuous CPAC operation (e.g., enabled/disabled, activate/deactivate), and according to an embodiment, in case where the corresponding field signaling is absent, it may indicate that the CPAC operation is deactivated.

Signaling is possible in the form of ENUMERATE {activate, deactivate}

2) Option 1-2: A method for notifying each SN to which the CPAC configuration provided by the base station 1h-02 is applied individually that continuous CPAC is supported.

Refer to Option 1-2 signaling method in Table 4 below (subsequentCG-Change-r18; ENUMERATED {reserved, unreserved})

Signaling by adding a field for the corresponding information to CondReconfigToAddMod-r16 IE and extending the same, and indicating whether to enable the corresponding operation. That is, the UE 1h-01 identifies whether continuous CPAC is applied for each CPAC configuration, and stores/keeps/maintains it according to the related configuration (the corresponding configuration is not released even after SCG change)

Separate signaling indicating whether to activate/deactivate continuous CPAC operation may be used for all CPAC configurations other than the corresponding field, and the signaling introduced in option 1-1 may be applied.

TABLE 4

| | |
|---|---|
| ConditionalReconfiguration-r16 ::= | SEQUENCE { |
| attemptCondReconfig-r16 | ENUMERATED {true} |
| OPTIONAL,       -- Cond CHO | |
| condReconfigToRemoveList-r16 | CondReconfigToRemoveList-r16 |
| OPTIONAL,       -- Need N | |
| condReconfigToAddModList-r16 | CondReconfigToAddModList-r16 |
| OPTIONAL,       -- Need N | |
| ..., | |
| // Option 1-1 | |
| [[           subsequentCG-Change-r18 | ENUMERATED {enabled} |
| OPTIONAL     -- Need R | |
| ]] | |
| CondReconfigToAddModList-r16 ::= | SEQUENCE (SIZE (1.. maxNrofCondCells-r16)) |
| OF CondReconfigToAddMod-r16 | |
| CondReconfigToAddMod-r16 ::= | SEQUENCE { |
| condReconfigId-r16 | CondReconfigId-r16, |
| condExecutionCond-r16 | SEQUENCE (SIZE (1..2)) OF MeasId |
| OPTIONAL,       -- Need M | |
| condRRCReconfig-r16 | OCTET STRING (CONTAINING |
| RRCReconfiguration)       OPTIONAL, | -- Cond condReconfigAdd |
| ..., | |
| [[ | |
| condExecutionCondSCG-r17 | OCTET STRING (CONTAINING |
| CondReconfigExecCondSCG-r17) OPTIONAL | -- Need M |
| ]], | |

TABLE 4-continued

```
// Option 1-2
    [[          subsequentCG-Change-r18          ENUMERATED  {reserved,
unreserved}               OPTIONAL,        -- Need R
    ]]
}
CondReconfigExecCondSCG-r17 ::=          SEQUENCE (SIZE (1..2)) OF MeasId
```

2. Option 2: Method for indicating continuous CPAC operation and update of applied configuration through MAC CE signaling Introduction of MAC CE with new LCID or eLCID Includes a field indicating activation/deactivation of continuous CPAC operation (a method for applying the corresponding field to the entire CPAC configuration or an individual CPAC configuration is possible). A detailed MAC CE structure is illustrated in FIG. 1I.

Can be additionally applied to the RRC signaling method of option 1 above

For the purpose of signaling an update for continuous CPAC operation by reducing latency and reducing signaling in case where there is a need to change whether or not to support SN CPAC operation based on inter-node RRC message with SN and negotiation through Xn interface.

In operation 1h-40, the MN base station 1h-01 may indicate a data forwarding address to the source SN base station 1h-03. Operation 1h-40 may be omitted. As described above, option 2 above may be used in operation 1h-45, and may be omitted in case where the RRC configuration is replaced and used (repetition of operations 1h-30/1h-35).

Thereafter, in case where the CPAC related condition received from the predetermined SN 1h-04 is satisfied, the UE 1h-01 may trigger the SN change procedure for the corresponding SN 1h-04. That is, in operation 1h-50, the UE 1h-01 may generate an MN RRCReconfigurationComplete including the SN RRCReconfigurationComplete message for the SN for which the SN change procedure is triggered (the SN for which the CPAC condition is satisfied), and transmit the same to the MN base station 1h-02. The MN base station 1h-02 may transmit a SgNB Release Request message requesting SCG configuration release to the source SN base station 1h-03 in operation 1h-55, and in operation 1h-60, the source SN base station 1h-03 may respond to the request by transmitting a SgNB Release Request Acknowledge message to the MN base station 1h-01. In operation 1h-65, the MN base station 1h-02 may transmit the SgNB Reconfiguration Complete message to the target SN base station 1h-04 for which the corresponding CPAC condition is satisfied, that is, the target SN base station 1h-04 to which the UE 1h-01 performs the SN change, and notify the SN change operation of the UE 1h-01. In addition, in operation 1h-70, the MN base station 1h-02 may perform a procedure for identifying the validity of the CPAC configuration transmitted to the UE 1h-01, with respect to the candidate SN base stations 1h-05 in which the SN has not been changed. That is, in the above operation 1h-70, the MN base station 1h-02 may request the candidate SN base stations 1h-05 whether the previously provided (continuous) CPAC configuration is valid even after the SCG change or whether the previously provided (continuous) CPAC configuration needs to be updated. The corresponding message may be a SgNB update request message or another Xn message, or may be an RRC inter-node message. In operation 1h-70, each of the candidate SNs 1h-05 transmits, to the MN base station 1h-02, a SgNB update request acknowledge or RRC inter-node message including (continuous) CPAC configuration update information in response to the message. The procedures in operations 1h-70 and 1h-75 may be omitted depending on implementations. In addition, the continuous CPAC operation that can be repeatedly performed thereafter is omitted in FIG. 1H, but the UE 1h-01 may perform related operations (CPC trigger and CPC execution) by continuously applying the received CPAC configuration.

In operation 1h-80, the UE 1h-01 may perform a random access procedure for changing an SN with respect to the target SN 1h-04 for which CPC is triggered. This operation may be performed only in the case where the update of security key is required, and may be omitted in other cases. In operation 1h-85, the MN base station 1h-02 may receive the sequence number (SN) status from the source SN base station 1h-03, and may transmit the received SN status to the target SN base station 1h-04 in operation 1h-90. In operation 1h-95, the MN base station 1h-02 may perform a procedure for transmitting (forwarding) the data from the UPF 1h-06 to the SN base station 1h-04. In addition, the MN base station 1h-02 may transmit a PDU session resource change indicator to an AMF 1h-07 as an operation for path update in operation 1h-100, the AMF 1h-07 and the UPF 1h-06 may perform the bearer modification procedure in operation 1h-105, and the UPF 1h-05 may transmit the PDU packet including an end marker to the MN base station 1h-02 in operation 1h-110 to indicate the change of a previous bearer. In operation 1h-115, the UPF 1u-06 may indicate a new path to the target SN base station 1h-04. In operation 1h-120, the AMF 1h-07 may transmit a PDU session resource change identification message indicating that the PDU session resource change has been completed to the MN base station 1h-02. In operation 1h-125, the MN base station 1h-02 may instruct the source SN base station 1h-03 to release the UE context.

FIG. 1I is diagram illustrating a structure of MAC CE signaling to continuously update candidate SCG configuration to support conditional PSCell addition and change according to an embodiment of the disclosure.

Referring to FIG. 1I, the details of the MAC CE signaling structure and operation applied to the embodiments of the disclosure will be described. Although not described in FIG. 1I, the same function may be performed in the DCI. An activation index may be provided in RRC or MAC CE signaling, and in DCI, a corresponding index may be activated or entire CPAC activation/deactivation may be indicated.

As described in the embodiments associated with FIGS. 1G and 1H, in embodiments of the disclosure, CPAC configurations are delivered to a UE supporting continuous CPAC operation and at the same time, signaling indicating whether the corresponding configurations should be kept/stored even after SCG change is required. In the embodiments associated with FIGS. 1G and 1H, a method for indicating this by RRC signaling as option 1 method has been proposed, and in addition to the corresponding option 1, as option 2, a method for dynamically updating the configuration to which the corresponding continuous CPAC configuration is applied through MAC CE signaling has been described. Similar to option 1, MAC CE of option 2 can be accessed in the following two ways.

1. Option 2-1 (1*i*-05): A method for notifying that a continuous CPAC is activated/deactivated in common for CPAC configurations for all SNs provided by the base station A/D field (1*i*-10): A field indicating that a continuous CPAC is activated/deactivated in common for all SNs to which CPAC provided by RRC configuration is applied R field (1*i*-15): reserved bit 2. Option 2-2 (1*i*-20): A method for notifying each SN to which the CPAC configuration provided by the base station is applied, that a continuous CPAC is activated/deactivated individually Pi field (1*i*-25): A field indicating that a continuous CPAC is activated/deactivated in common for each SN to which the CPAC provided by RRC configuration is applied. The i in the Pi field corresponds to the CPAC configuration index (condReconfigId-r16) provided in the RRC configuration. The bitmap size is assumed to be 8, and may have a size of an extended index or other value thereafter.

The index may be replaced with an explicit ID rather than a bitmap, and an additional field may be provided in addition to the index.

Figure 1J:
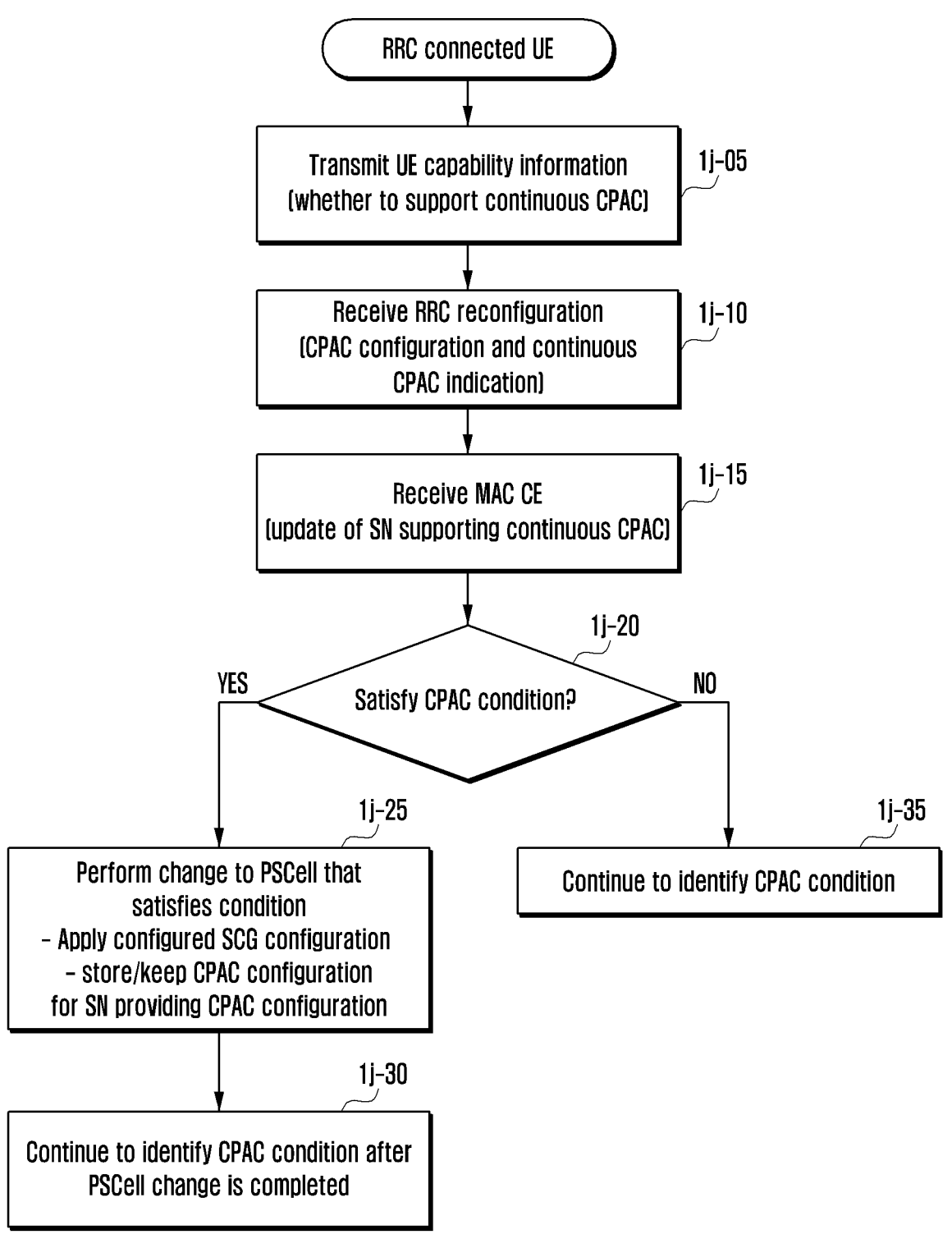
FIG. 1J is a diagram illustrating a UE operation to which embodiments of the disclosure is applied, which embodies a UE operation when conditional PSCell addition and change are continuously applied according to an embodiment of the disclosure.

FIG. 1J is a diagram illustrating a UE operation to which embodiments of the disclosure is applied, which embodies a UE operation when conditional PSCell addition and change are continuously applied according to an embodiment of the disclosure.

Referring to FIG. 1J, in operation 1*j*-05, the RRC connected UE may transmit the UE capability to the base station through a UE capability information (UECapabilityInformation) message according to the base station's request (UECapabilityEnquiry). The corresponding UE capability may include an indicator indicating whether the UE supports continuous CPAC. The UE capability may be delivered using one of the feature set methods for each UE, each band, or each band combination, and may be transmitted separately for CPA and CPC. In operation 1*j*-10, the UE may receive RRC (re)configuration from the base station, and basic configurations for data transmission and reception may be provided in the corresponding configuration. In addition, the RRC configuration may include CPAC configuration for a plurality of SNs and an indicator indicating that continuous CPAC is applied. In operation 1*j*-15, the UE may additionally receive a MAC CE updating activation/deactivation information for an SN supporting continuous CPAC from the base station. The MAC CE operation may be omitted, and when there is no corresponding information, the UE may operate by applying CPAC related configurations configured through RRC.

When the UE receives the RRC configuration and MAC CE signaling on operation 1*j*-20, in case where the condition is satisfied, the UE may perform change to the PSCell that satisfies the condition in operation 1*j*-25, while continuously identifying the CPAC triggering conditions included in the CPAC configuration. That is, the UE applies the SCG configuration information provided in the CPAC configuration, and in case where random access is required for the corresponding PSCell, random access is performed and uplink synchronization is matched. The UE may perform an operation for PSCell change and additionally store/keep/maintain CPAC configuration for the SN providing CPAC configuration. The storage/keep/maintain of the CPAC related configuration for the SN providing the CPAC configuration may be updated according to the RRC configuration provided in operation 1*j*-10 and MAC CE signaling in operation 1*j*-15. That is, the configuration information may be updated according to the most recently provided information. In operation 1*j*-30, the UE may continue to identify the channel measurement value and CPAC condition based on the stored CPAC configuration for the SN supporting continuous CPAC operation after completing the change to the target PSCell, and perform the CPAC operation. Thereafter, the UE may perform operations after operation 1*j*-10 or operation 1*j*-15 according to base station signaling.

When the UE receives the RRC configuration and MAC CE signaling in operation 1*j*-20, the UE continuously identifies the CPAC triggering conditions included in the CPAC configuration in operation 1*j*-35. The UE may perform operations after operation 1*j*-10 or operation 1*j*-15 according to base station signaling.

FIG. 1K is a diagram illustrating a base station operation to which embodiments of the disclosure is applied, which embodies a base station operation when conditional PSCell addition and change are continuously applied according to an embodiment of the disclosure.

Referring to FIG. 1K, in operation 1*k*-05, the base station may transmit a UE capability request (UECapabilityEnquiry) message to the UE to acquire the UE capability, and thus receive the UE capability from the UE through the UE capability information (UECapabilityInformation) message. The corresponding UE capability may include an indicator indicating whether the UE supports continuous CPAC. The UE capability may be delivered using one of the feature set methods for each UE, each band, or each band combination, and may be transmitted separately for CPA and CPC. The base station may identify the corresponding UE capability and determine whether to instruct continuous CPAC operation via RRC configuration thereafter. In operation 1*k*-10, the base station may perform negotiation with SNs that are candidates for SN addition and change to identify whether to support CPAC support and to perform related configuration. In operation 1*k*-10, the base station identifies whether each SN supports continuous CPAC, and the base station may transfer CPAC related configuration to the UE through RRC reconfiguration based on the identification in operation 1*k*-15. That is, an indicator indicating continuous CPAC operation according to the configurations provided by each SN may be provided to the UE together with the CPAC configuration.

In operation 1*k*-20, the base station may receive an RRCReconfigurationComplete message from the UE, in response to the RRC reconfiguration that has provided the SN configuration (CPAC configuration) (receiving the SN RRC complete message included in the MN RRC message), and identify that PSCell change is complete. In operation 1*k*-25, the MN base station may identify whether there is keep and update of (continuous) CPAC configuration to SNs that have provided CPAC configuration. After negotiation with the SN nodes in operation 1*k*-25, in case where the (continuous) CPAC configuration is updated, the base station may indicate this update to the UE through MAC CE. For detailed MAC CE operation, refer to FIG. 1I. In addition, according to an embodiment, RRC configuration in operation 1*k*-15 may be performed instead of MAC CE signaling in operation 1*k*-30.

Figure 1L:
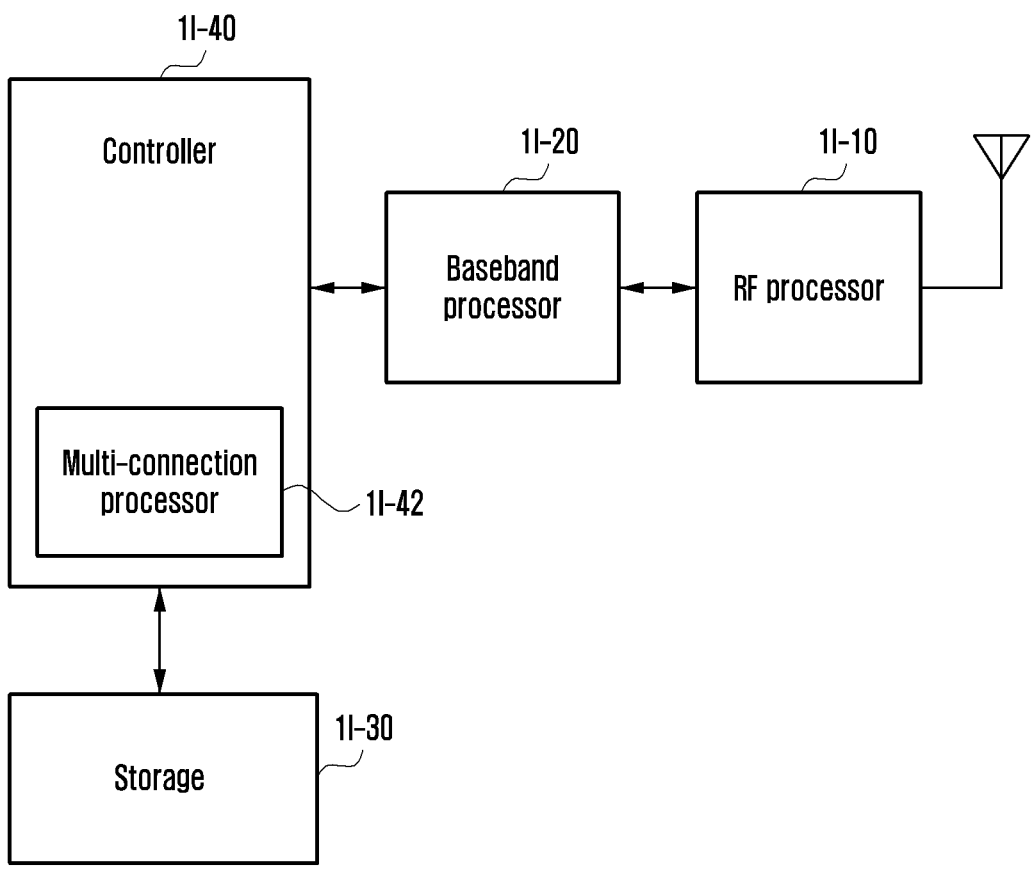
FIG. 1L is a block diagram illustrating an internal structure of a UE according to an embodiment of the disclosure.

FIG. 1L is a block diagram illustrating an internal constitution of a UE according to an embodiment of the disclosure.

Referring to FIG. 1L, the UE includes a radio frequency (RF) processor 1*l*-10, a baseband processor 1*l*-20, a storage 1*l*-30, and a controller 1*l*-40.

The RF processor 1*l*-10 performs the functions of signal band conversion and amplification and the like to receive and transmit signals over a radio channel. That is, the RF processor 1*l*-10 up-converts the baseband signal provided from the baseband processor 1*l*-20 into an RF band signal and then transmits the signal through the antenna, and down-converts the RF band signal received through the antenna into a baseband signal. For example, the RF processors 1*l*-10 may include a transmit filter, a receive filter, an amplifier, a mixer, an oscillator, a digital to analog convertor (DAC), an analog to digital convertor (ADC), and the like. Although one antenna is illustrated in FIG. 1L, the terminal may include a plurality of antennas. In addition, the RF processor 1*l*-10 may comprise a plurality of RF chains. Further, the RF processors 1*l*-10 may perform beamforming. For beamforming, the RF processor 1*l*-10 may adjust the phase and magnitude of signals transmitted/received through the antenna or antenna element. The RF processor may perform MIMO operation, and may receive multiple layers when performing the MIMO operation.

The baseband processor 1*l*-20 perform the function of converting between baseband signals and bit strings according to the physical layer protocol of the system. For example, the baseband processor 1*l*-20 performs coding and modulation on the transmission bit string to generate complex symbols when transmitting data. In addition, when receiving data, the baseband processor 1*l*-20 performs demodulation and decoding on the baseband signal provided from the RF processor 1*l*-10 to recover the received bit string. For example, in case of following an orthogonal frequency division multiplexing (OFDM) scheme, the baseband processor 1*l*-20 performs coding and modulation on the transmission bit string to generate complex symbols, maps the complex symbols to subcarriers, performs inverse fast Fourier transform (IFFT) on the subcarriers, and inserts cyclic prefix (CP) to generate OFDM symbols when transmitting data. In addition, when receiving data, the baseband processor 1*l*-20 separates the baseband signal provided from the RF processor 1*l*-10 into OFDM symbols, restores the signal mapped to the subcarriers by the fast Fourier transform (FFT) computation, and performs demodulation and decoding to restore the bit string.

As described above, the baseband processors 1*l*-20 and the RF processors 1*l*-10 are responsible for transmitting and receiving signals. Accordingly, the baseband processors 1*l*-20 and the RF processors 1*l*-10 may be referred to as a transmitter, a receiver, a transceiver, or a communication unit. Further, at least one of the baseband processor 1*l*-20 and the RF processor 1*l*-10 may comprise a plurality of communication modules for supporting different radio access technologies. In addition, at least one of the baseband processor 1*l*-20 and the RF processor 1*l*-10 may include different communication modules for processing different frequency band signals. Examples of different radio access technologies include WLANs (e.g., IEEE 802.11) and cellular networks (e.g., LTE). Examples of different frequency bands may include super high frequency (SHF) frequency bands (e.g., 2. N RHz, N Rhz) and millimeter wave frequency bands (e.g., 60 GHz).

The storages 1*l*-30 store basic programs for the operation of the terminal, application programs, and data such as configuration information. In particular, the storage 1*l*-30 may store information about the secondary access node with which the terminal performs radio communication using the secondary radio access technology. The storage 1*l*-30 provides stored data in response to a request from the controller 1*l*-40.

The controllers 1*l*-40 control the overall operation of the terminal. For example, the controller 1*l*-40 controls the baseband processor 1*l*-20 and the RF processor 1*l*-10 to transmit/receive signals. The controller 1*l*-40 also writes data to the storage 1*l*-40 and reads data from the storage 1*l*-30. To achieve this, the controllers 1*l*-40 may include at least one processor 1*l*-42. For example, the controllers 1*l*-40 may include communication processor (CP) for controlling communications and application processor (AP) for providing upper layers such as applications.

Figure 1M:
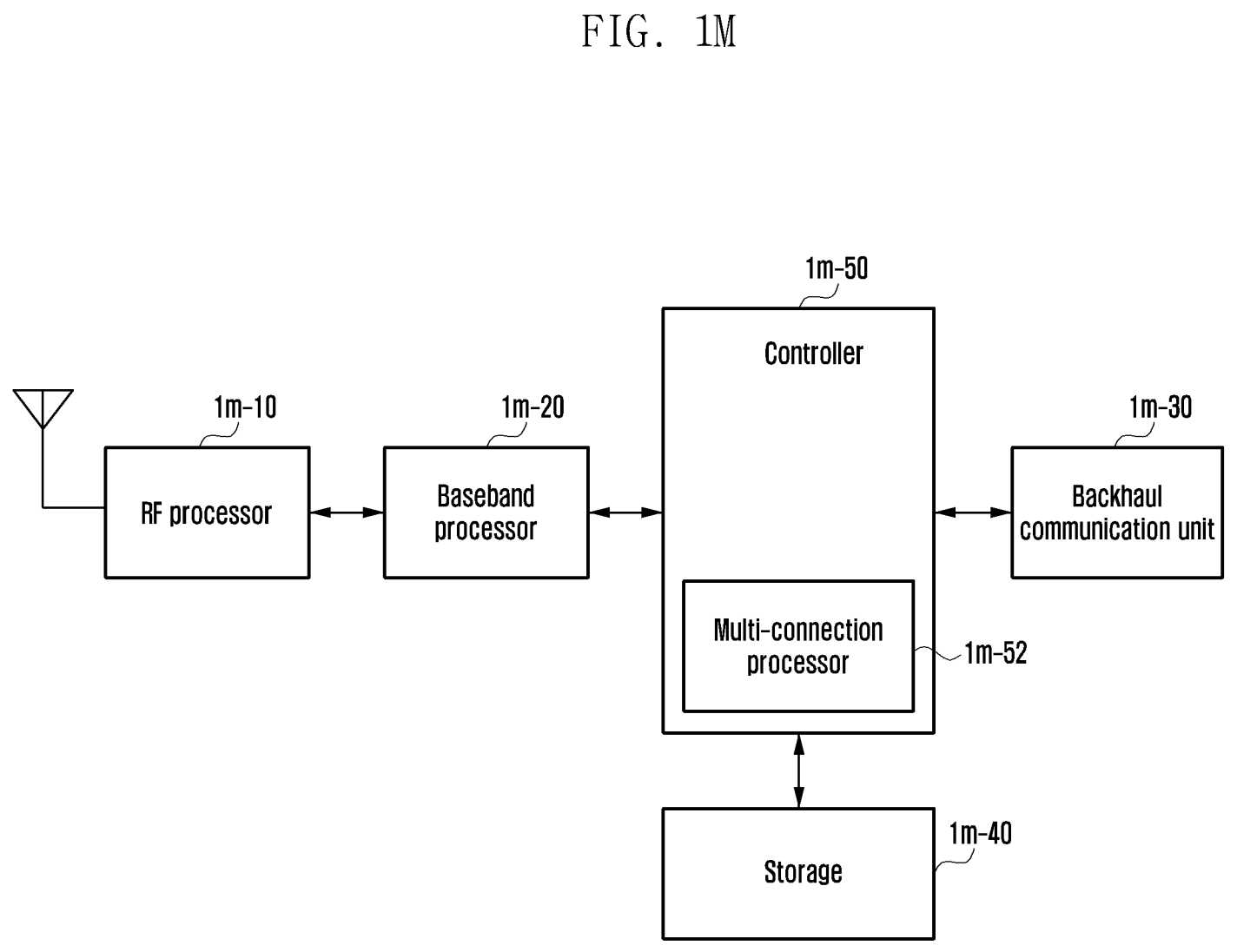

FIG. 1M is a block diagram illustrating a constitution of a base station according to an embodiment of the disclosure.

Referring to FIG. 1M, the base station is constituted to include an RF processor 1*m*-10, a baseband processor 1*m*-20, a backhaul communication unit 1*m*-30, a storage 1*m*-40, and a controller 1*m*-50.

The RF processor 1*m*-10 performs the function of signal band conversion, amplification and the like to transmit signals over the radio channel. That is, the RF processor 1*m*-10 up-converts the baseband signals provided from the baseband processor 1*m*-20 into RF band signals, and then transmits the signal through the antennas, and down-converts the RF band signals received through the antennas into baseband signals. For example, the RF processor 1*m*-10 may include a transmit filter, a receive filter, an amplifier, a mixer, an oscillator, a DAC, an ADC, and the like. Although one antenna is depicted in FIG. 1M, the base station may include a plurality of antennas. In addition, the RF processor 1*m*-10 may comprise a plurality of RF chains. The RF processor 1*m*-10 may perform beamforming. For beamforming, the RF processor 1*m*-10 may adjust the phase and magnitude of signals transmitted/received through the antennas or antenna elements. The RF processor 1*m*-10 may perform downlink MIMO operations to transmit signals on one or more layers.

The baseband processor 1*m*-20 performs the function of converting between baseband signals and bit strings according to the physical layer protocol of a first radio access technology. For example, the baseband processor 1*m*-20 performs coding and modulation on the transmission bit string to generate complex symbols when transmitting data. The baseband processor 1*m*-20 also performs demodulation and decoding on the baseband signals provided from the RF processor 1*m*-10 to recover the received bit string when receiving data. For example, in the case of following an OFDM scheme, the baseband processor 1*m*-20 performs coding and modulation on a transmission bit string to generate complex symbols, maps the complex symbols to subcarriers, performs IFFT computation on the subcarriers, and insert CP to generate OFDM symbols when transmitting data. In addition, the baseband processor 1*m*-20 separates the baseband signals provided from the RF processor 1*m*-10 into OFDM symbols, recovers the signals mapped to the subcarriers by the FFT computation, and performs demodulation and decoding to recover the bit strings when receiving data. As described above, the baseband processor 1*m*-20 and the RF processor 1*m*-10 are responsible for transmitting and receiving signals. Thus, the baseband processor 1*m*-20 and the RF processor 1*m*-10 may be referred to as a transmitter, a receiver, a transceiver, a communication unit, or a wireless communication unit.

The backhaul communication unit 1*m*-30 provides interfaces for communicating with other nodes in a network. That is, the backhaul communication unit 1*m*-30 converts a bit string to be transmitted from the base station to another node, for example, an auxiliary base station, a core network, etc. into a physical signal, and converts a physical signal received from another node into a bit string.

The storage 1m-40 stores basic programs, application programs, and data such as configuration information for the operation of the base station. In particular, the storage 1m-40 may store information about bearers allocated to the connection terminals and measurement results reported by the terminals. The storage 1m-40 may also store information as criteria for determining whether to enable or disable multi-connectivity of the terminal. The storage 1m-40 provides stored data in response to requests from the controller 1m-50.

The controller 1m-50 controls the overall operations of the base station. For example, the controller 1m-50 transmits and receives signals through the baseband processor 1m-20 and the RF processor 1m-10, or through the backhaul communication unit 1m-30. The controller 1m-50 also writes data to the storage 1m-40 and reads data from the storage 1m-40. To achieve this, the controller 1m-50 may include at least one processor 1M-52.

It should be noted that in the constitution diagrams illustrated in FIGS. 1A to 1M, a control/data signal transmission method, an operational procedure example, and constitution diagrams are not intended to limit the scope of the disclosure. In other words, all components, entities, or operations described in the above should not be interpreted as essential components for the implementation of the disclosure, and may be implemented within a range that does not impair the nature of the disclosure, even if only some of the components are included.

The operations of the network entity or the terminal described above can be realized by providing a memory device storing the corresponding program code to any component in the network entity or the terminal device. That is, the controller of the network entity or the terminal device can execute the above-described operations by reading out and executing the program code stored in the memory device by a processor or a central processing unit (CPU).

The various components of the network entity, base station, or terminal device, modules, etc. described herein may be operated using hardware circuitry, for example, complementary metal oxide semiconductor based logic circuitry, firmware, software and/or any combination of hardware, firmware, and/or software embodied in a machine readable medium. For example, various electrical structures and methods may be embodied using transistors, logic gates, and electrical circuits such as application specific semiconductors.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:

transmitting, to a base station, capability information of the terminal comprising information indicating that the terminal supports a subsequent conditional primary secondary cell group (SCG) cell (PSCell) addition or change (CPAC);

receiving, from the base station, a first message comprising conditional reconfiguration information, the conditional reconfiguration information comprising configuration information of at least one candidate PSCell, information on at least one execution condition for a conditional PSCell addition (CPA) or a conditional PSCell change (CPC) of the at least one candidate PSCell, and information associated with the subsequent CPAC;

in case that at least one execution condition for the CPA or the CPC of a first PSCell among the at least one candidate PSCell is satisfied, transmitting, to the base station, a second message for an addition of the first PSCell or for a change to the first PSCell; and evaluating the at least one execution condition for the CPA or the CPC of the at least one candidate PSCell after completion of the addition of the first PSCell or the change to the first PSCell, wherein the conditional reconfiguration information is kept in the terminal.

2. The method of claim 1, wherein the evaluating further comprises:

in case that at least one execution condition for the CPC of a second PSCell among the at least one candidate PSCell is satisfied, transmitting, to the base station, a third message for a change from the first PSCell to the second PSCell.

3. The method of claim 1, wherein the first message is a message to modify a radio resource control (RRC) connection.

4. The method of claim 1, wherein the conditional reconfiguration information is kept in the terminal unless the base station indicates to release the conditional reconfiguration information.

5. A method performed by a first base station in a wireless communication system, the method comprising:

receiving, from a terminal, capability information of the terminal comprising information indicating that the terminal supports a subsequent conditional primary secondary cell group (SCG) cell (PSCell) addition or change (CPAC);

transmitting, to the terminal, a first message comprising conditional reconfiguration information, the conditional reconfiguration information comprising configuration information of at least one candidate PSCell, information on at least one execution condition for a conditional PSCell addition (CPA) or a conditional PSCell change (CPC) of the at least one candidate PSCell, and information associated with the subsequent CPAC;

in case that at least one execution condition for the CPA or the CPC of a first PSCell among the at least one candidate PSCell is satisfied, receiving, from the terminal, a second message for an addition of the first PSCell or for a change to the first PSCell; and transmitting, to a second base station for the first PSCell, a third message for the addition of the first PSCell or for the change to the first PSCell, wherein the conditional reconfiguration information is kept in the terminal after completion of the addition of the first PSCell or the change to the first PSCell.

6. The method of claim 5, further comprising:

in case that at least one execution condition for the CPC of a second PSCell among the at least one candidate PSCell is satisfied, receiving, from the terminal, a fourth message for a change from the first PSCell to the second PSCell.

7. The method of claim 5, wherein the first message is a message to modify a radio resource control (RRC) connection.

8. The method of claim 5, wherein the conditional reconfiguration information is kept in the terminal unless the base station indicates to release the conditional reconfiguration information.

9. A terminal in a wireless communication system, the terminal comprising:

a transceiver; and a controller coupled with the transceiver and configured to:

transmit, to a base station, capability information of the terminal comprising information indicating that the terminal supports a subsequent conditional primary secondary cell group (SCG) cell (PSCell) addition or change (CPAC), receive, from the base station, a first message comprising conditional reconfiguration information, the conditional reconfiguration information comprising configuration information of at least one candidate PSCell, information on at least one execution condition for a conditional PSCell addition (CPA) or a conditional PSCell change (CPC) of the at least one candidate PSCell, and information associated with the subsequent CPAC, in case that at least one execution condition for the CPA or the CPC of a first PSCell among the at least one candidate PSCell is satisfied, transmit, to the base station, a second message for an addition of the first PSCell or for a change to the first PSCell, and evaluate the at least one execution condition for the CPA or the CPC of the at least one candidate PSCell after completion of the addition of the first PSCell or the change to the first PSCell, wherein the conditional reconfiguration information is kept in the terminal.

10. The terminal of claim 9, wherein the controller is further configured to:

in case that at least one execution condition for the CPC of a second PSCell among the at least one candidate PSCell is satisfied, transmit, to the base station, a third message for a change from the first PSCell to the second PSCell.

11. The terminal of claim 9, wherein the first message is a message to modify a radio resource control (RRC) connection.

12. The terminal of claim 9, wherein the conditional reconfiguration information is kept in the terminal unless the base station indicates to release the conditional reconfiguration information.

13. A first base station in a wireless communication system, the first base station comprising:

a transceiver; and a controller coupled with the transceiver and configured to:

receive, from a terminal, capability information of the terminal comprising information indicating that the terminal supports a subsequent conditional primary secondary cell group (SCG) cell (PSCell) addition or change (CPAC), transmit, to the terminal, a first message comprising conditional reconfiguration information, the conditional reconfiguration information comprising configuration information of at least one candidate PSCell, information on at least one execution condition for a conditional PSCell addition (CPA) or a conditional PSCell change (CPC) of the at least one candidate PSCell, and information associated with the subsequent CPAC, in case that at least one execution condition for the CPA or the CPC of a first PSCell among the at least one candidate PSCell is satisfied, receive, from the terminal, a second message for an addition of the first PSCell or for a change to the first PSCell, and transmit, to a second base station for the first PSCell, a third message for the addition of the first PSCell or for the change to the first PSCell, wherein the conditional reconfiguration information is kept in the terminal after completion of the addition of the first PSCell or the change to the first PSCell.

14. The first base station of claim 13, wherein the controller is further configured to:

in case that at least one execution condition for the CPC of a second PSCell among the at least one candidate PSCell is satisfied, receive, from the terminal, a fourth message for a change from the first PSCell to the second PSCell.

15. The first base station of claim 13, wherein the first message is a message to modify a radio resource control (RRC) connection.

16. The first base station of claim 13, wherein the conditional reconfiguration information is kept in the terminal unless the base station indicates to release the conditional reconfiguration information.

* * * * *